United States Patent
Lee et al.

(10) Patent No.: US 10,955,623 B2
(45) Date of Patent: Mar. 23, 2021

(54) WATERPROOF FIBER OPTIC CONNECTOR ASSEMBLY AND METHOD OF USE

(71) Applicant: Senko Advanced Components, Inc., Marlborough, MA (US)

(72) Inventors: Benjamin Lee, Sudbury, MA (US); Kazuyoshi Takano, Tokyo (JP); Jeffrey Gniadek, Oxford, ME (US)

(73) Assignee: Senko Advanced Components, Inc., Marlborough (MA)

( * ) Notice: Subject to any disclaimer, the term of this patent is extended or adjusted under 35 U.S.C. 154(b) by 0 days.

(21) Appl. No.: 16/844,744

(22) Filed: Apr. 9, 2020

(65) Prior Publication Data

US 2020/0233154 A1  Jul. 23, 2020

Related U.S. Application Data

(63) Continuation of application No. 16/283,161, filed on Feb. 22, 2019, now Pat. No. 10,732,359.

(60) Provisional application No. 62/644,011, filed on Mar. 16, 2018.

(51) Int. Cl.
*G02B 6/38* (2006.01)

(52) U.S. Cl.
CPC ......... *G02B 6/3825* (2013.01); *G02B 6/3874* (2013.01)

(58) Field of Classification Search
None
See application file for complete search history.

(56) References Cited

U.S. PATENT DOCUMENTS

| | | | |
|---|---|---|---|
| 2,027,962 | A | 1/1936 | Currie |
| 5,283,853 | A | 2/1994 | Szegda |
| 5,317,663 | A | 5/1994 | Beard et al. |
| 6,318,903 | B1 | 11/2001 | Andrews et al. |
| 6,558,044 | B1 | 5/2003 | Chen |
| 2008/0175541 | A1 | 7/2008 | Lu et al. |
| 2008/0175546 | A1 | 7/2008 | Lu et al. |
| 2011/0033165 | A1 | 2/2011 | Guest |
| 2017/0276887 | A1 | 9/2017 | Allen |
| 2017/0285279 | A1 | 10/2017 | Daems et al. |
| 2019/0064464 | A1* | 2/2019 | He ................. G02B 6/3874 |

OTHER PUBLICATIONS

International Search Report and Written Opinion, Application No. PCT/US19/19229, dated Jun. 20, 2019 pp. 12.

* cited by examiner

*Primary Examiner* — Chad H Smith
(74) *Attorney, Agent, or Firm* — Edward S. Jarmolowicz, Esq.

(57) ABSTRACT

Optical fiber connectors and adapters are disclosed. A connector assembly includes a sleeve seal positioned near a proximal end of the connector, the seal fits over an alignment sleeve contained within an adapter. The connector may include a heat shrinkable tubing covering a distal end of the connector to prevent ingress of moisture and debris. The sleeve seal is compressed by a proximal face of a connector plug frame. The sleeve seal contains a plural of sealing or mating surfaces to prevent the ingress of moisture through the adapter opening into the plug frame housing a ferrule. The adapter further comprises a washer-seal that is placed between an adapter flange face and a module face plate that secures the adapter with connectors therein to a rack of adapters.

15 Claims, 30 Drawing Sheets

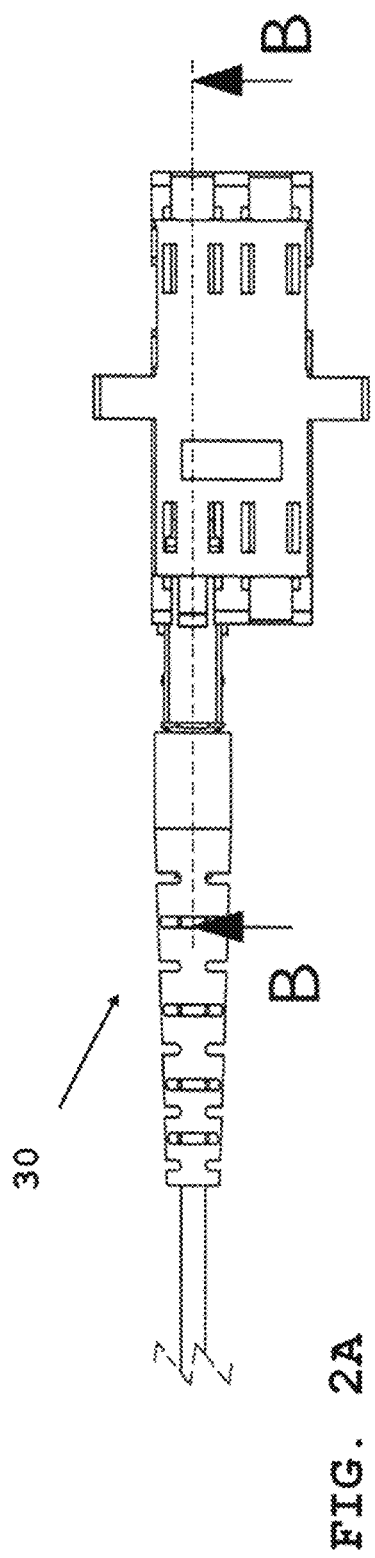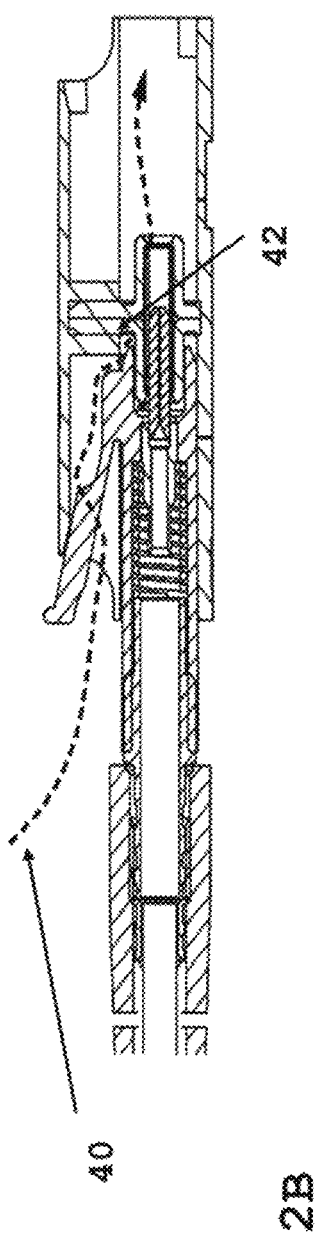
FIG. 2A
FIG. 2B SECTION B-B

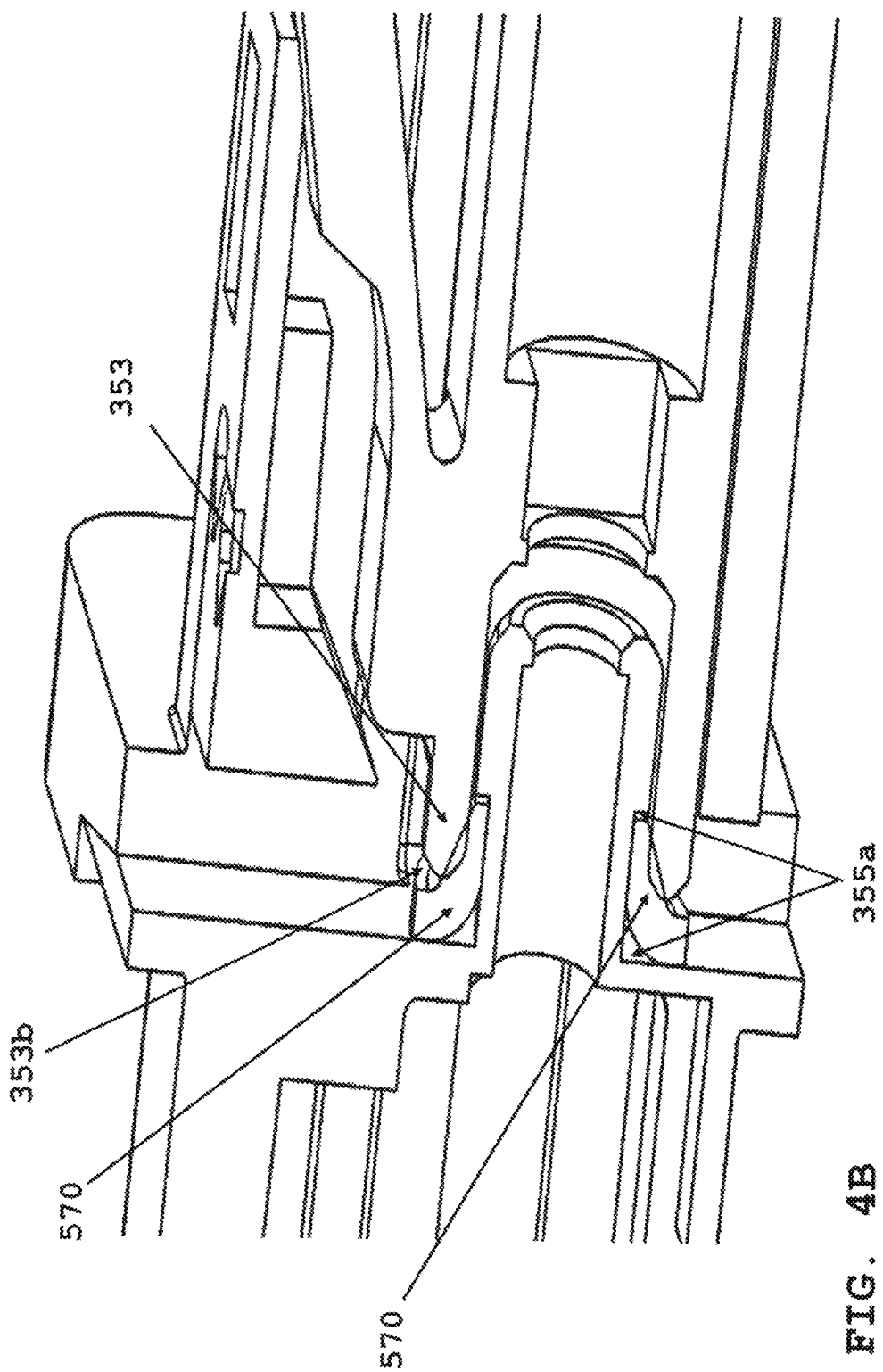

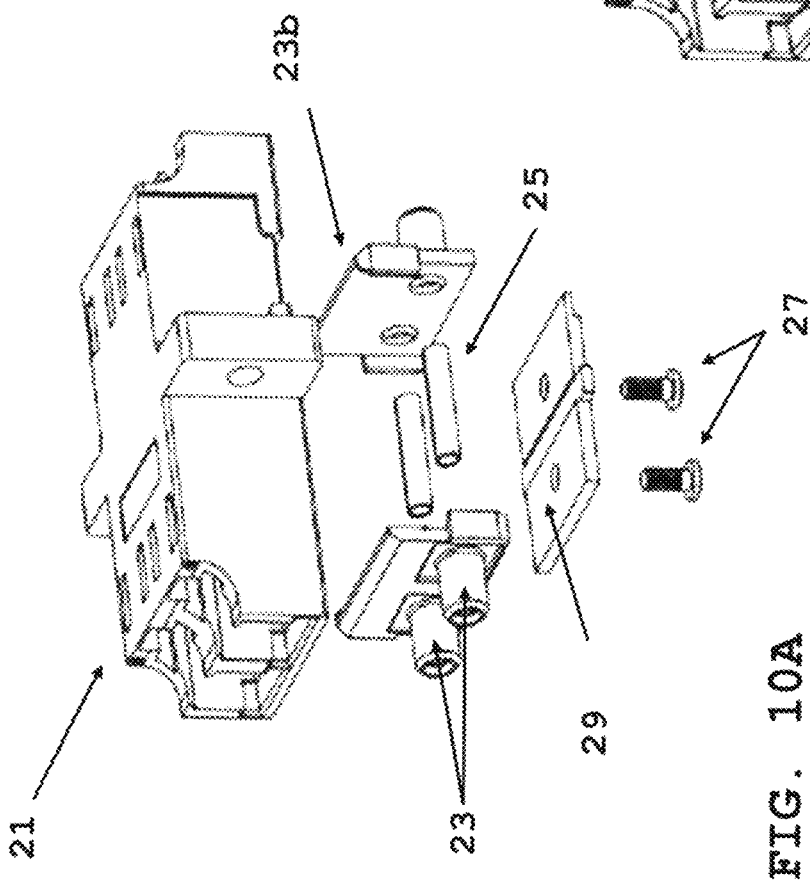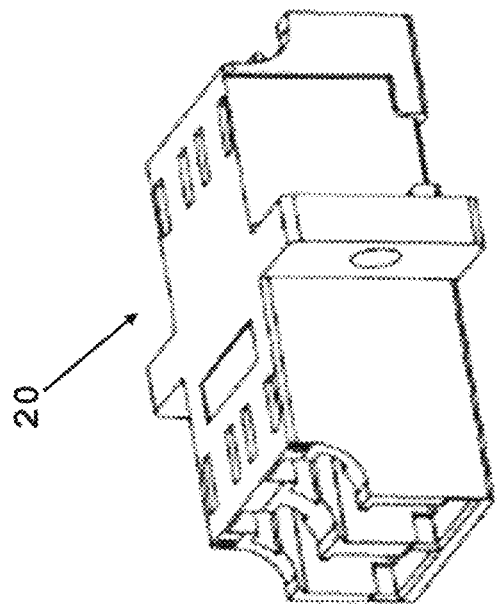
FIG. 10A
FIG. 10B

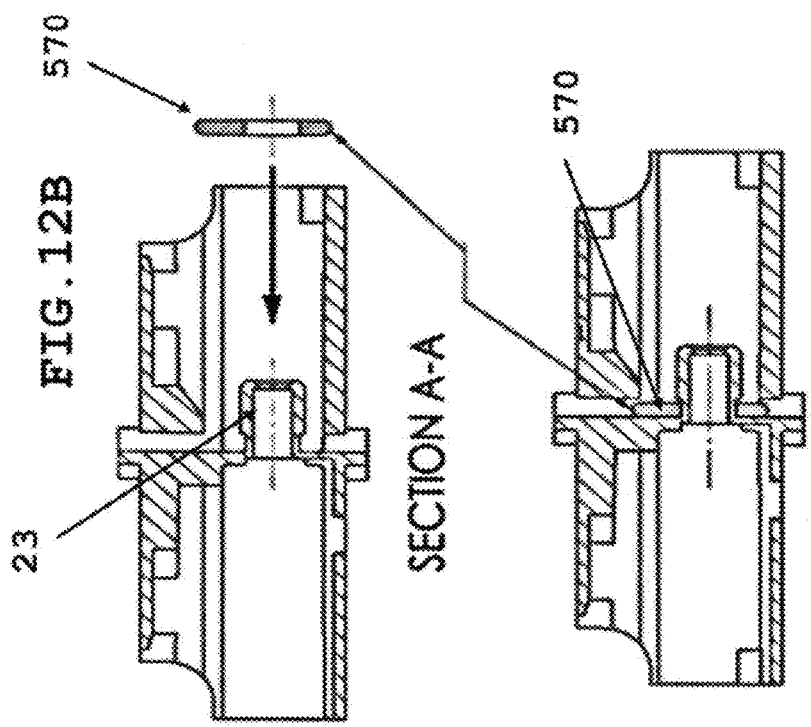
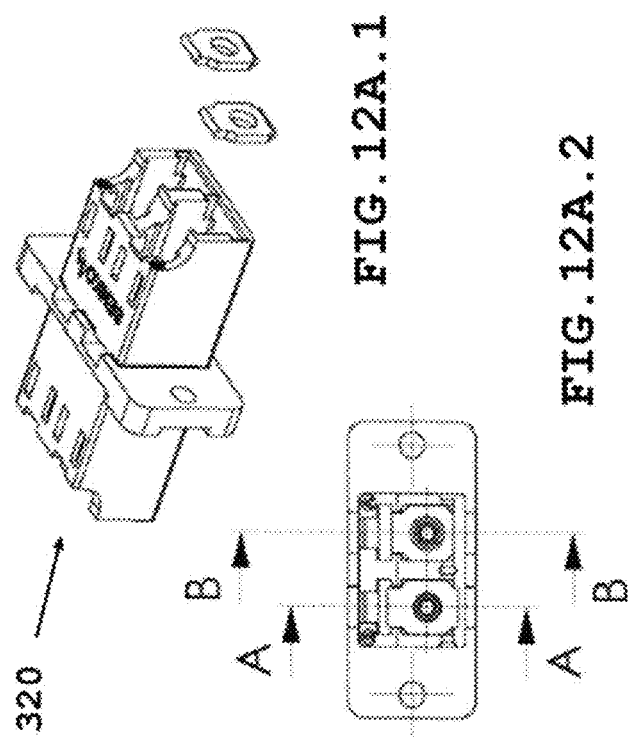

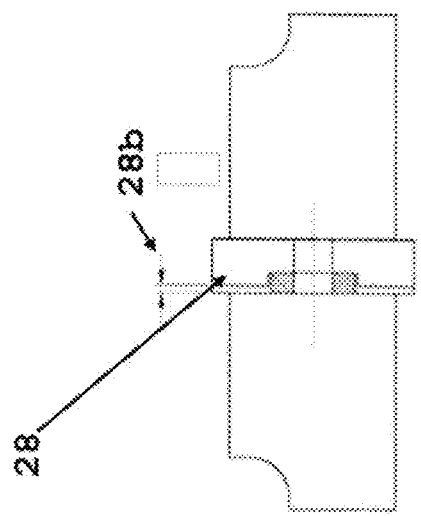
FIG. 13C SECTION C-C
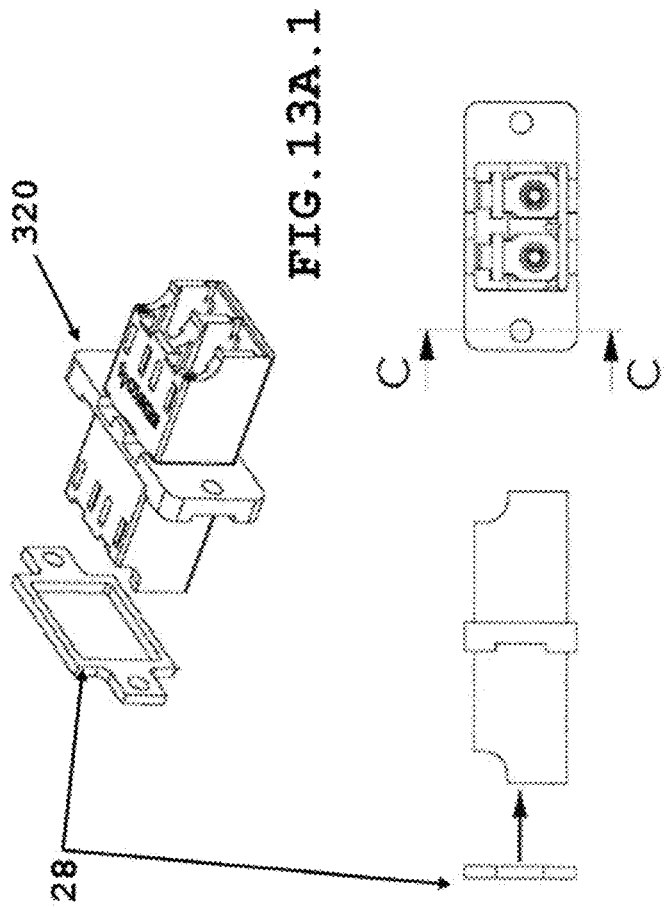
FIG. 13A.1
FIG. 13B
FIG. 13A.2

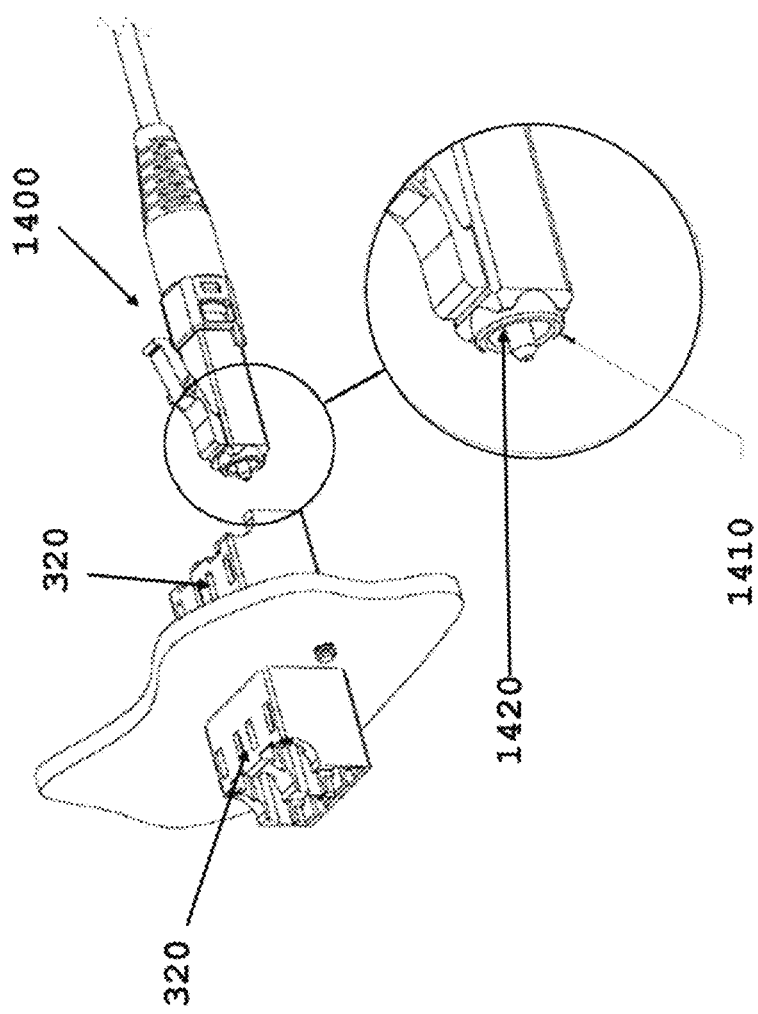
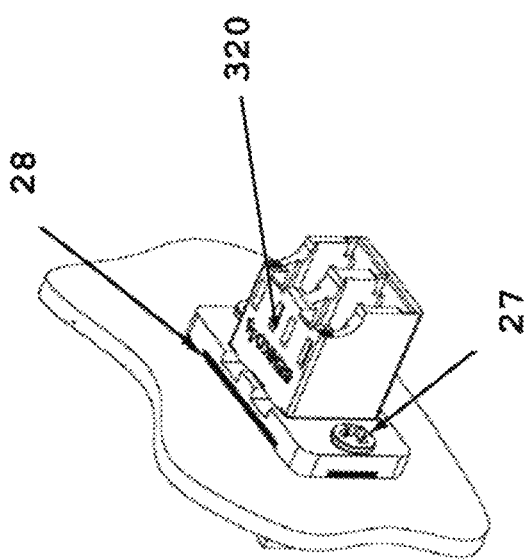

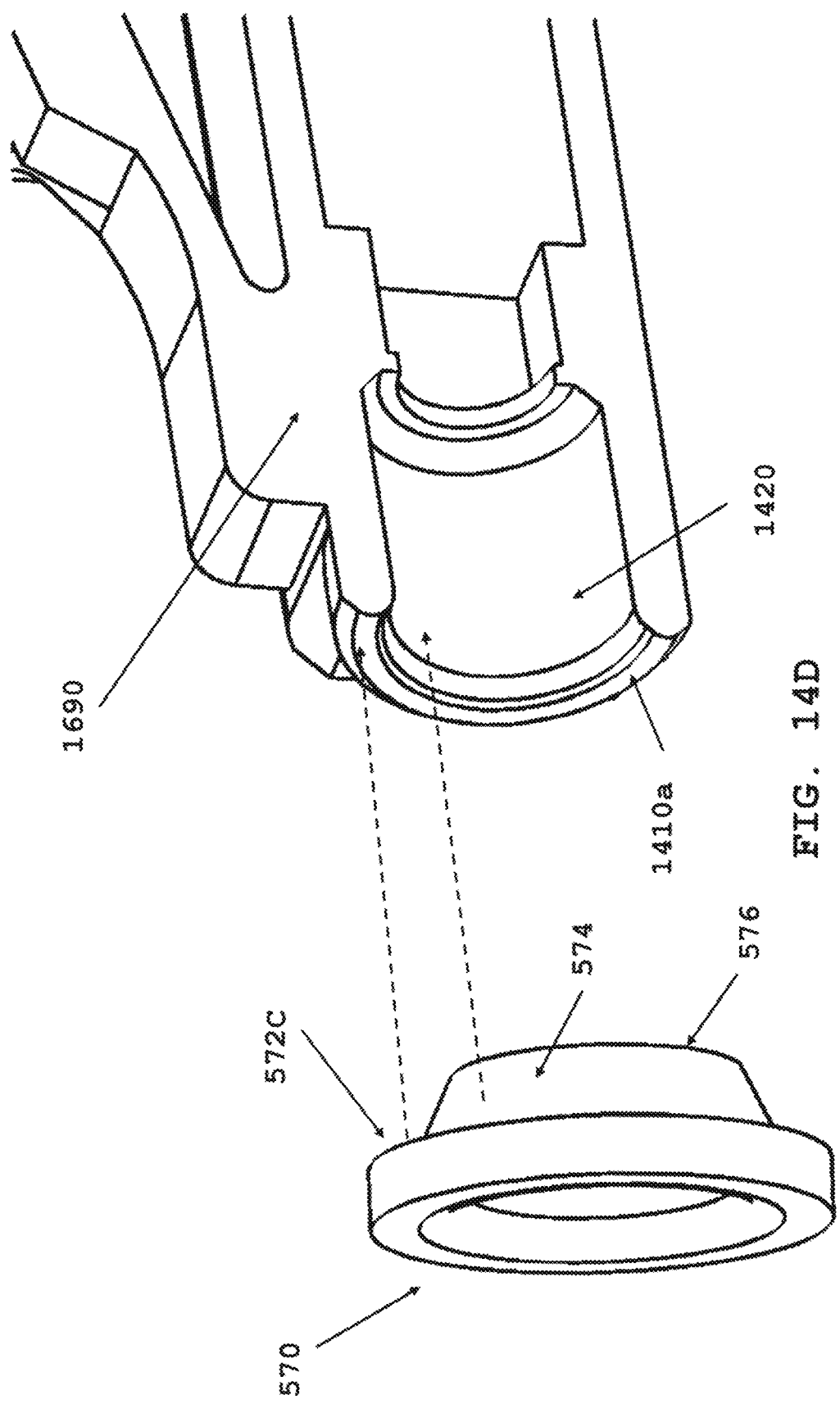

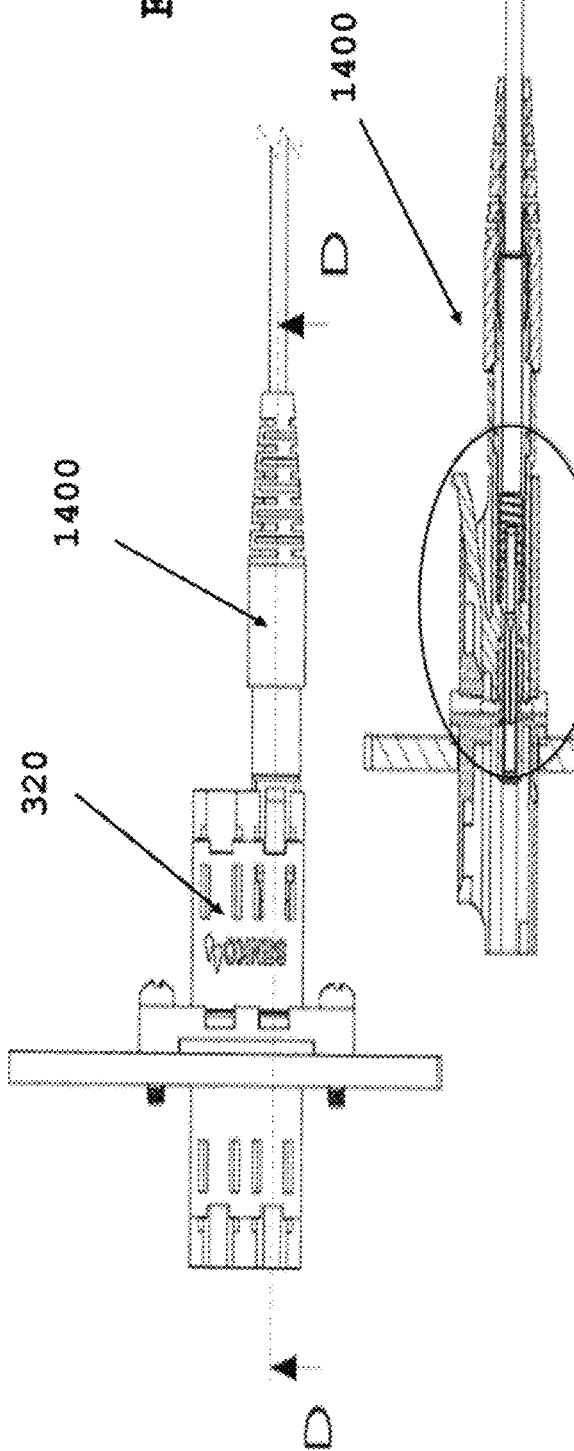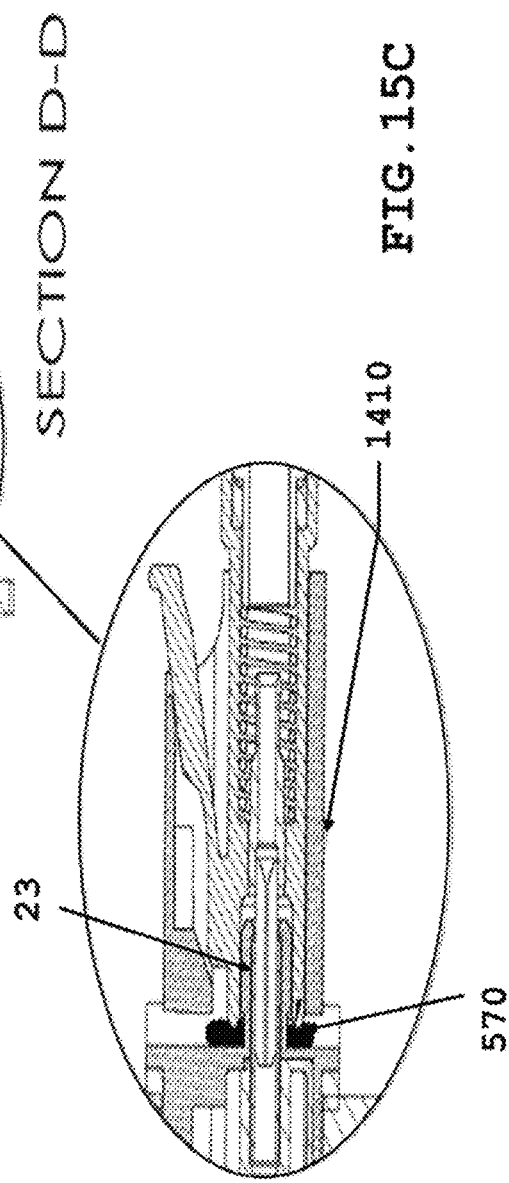

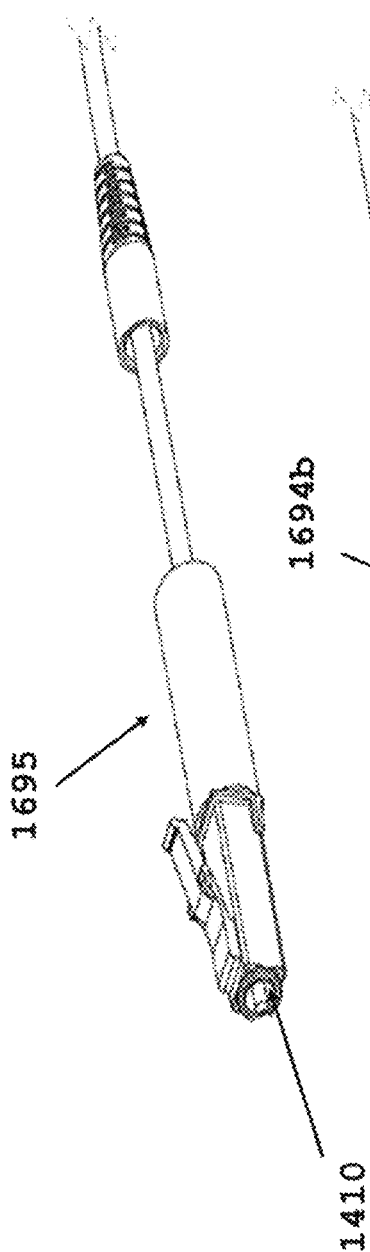
FIG.16B.1
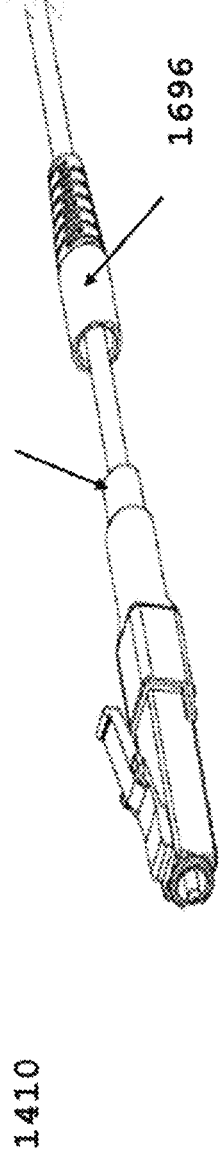
FIG.16B.2
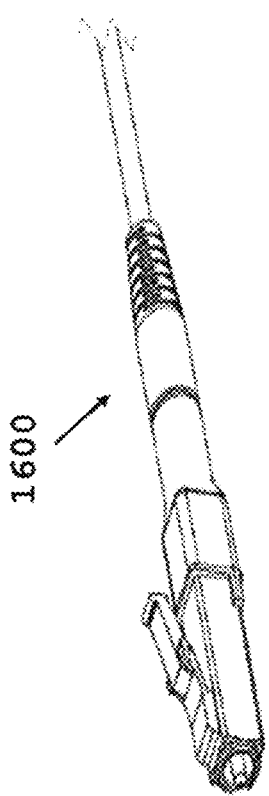
FIG.16B.3

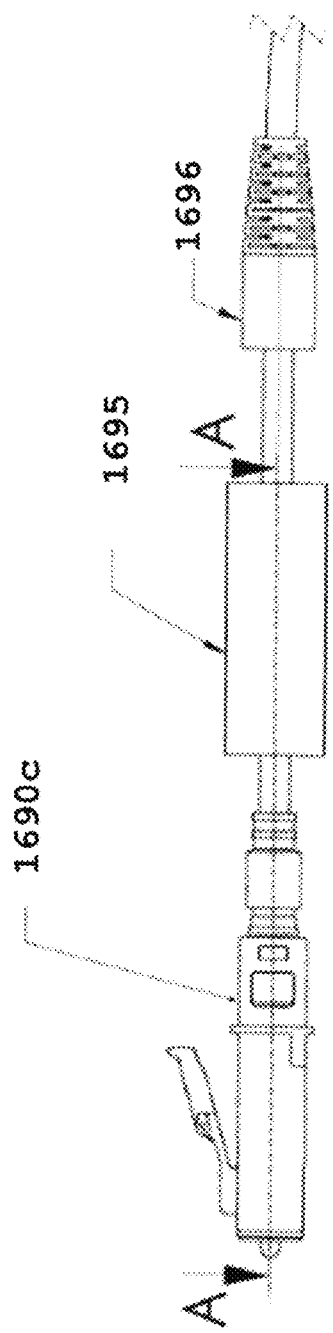
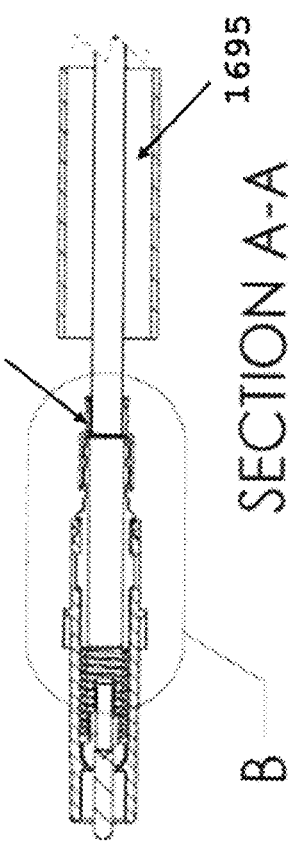
FIG. 17A
FIG. 17B

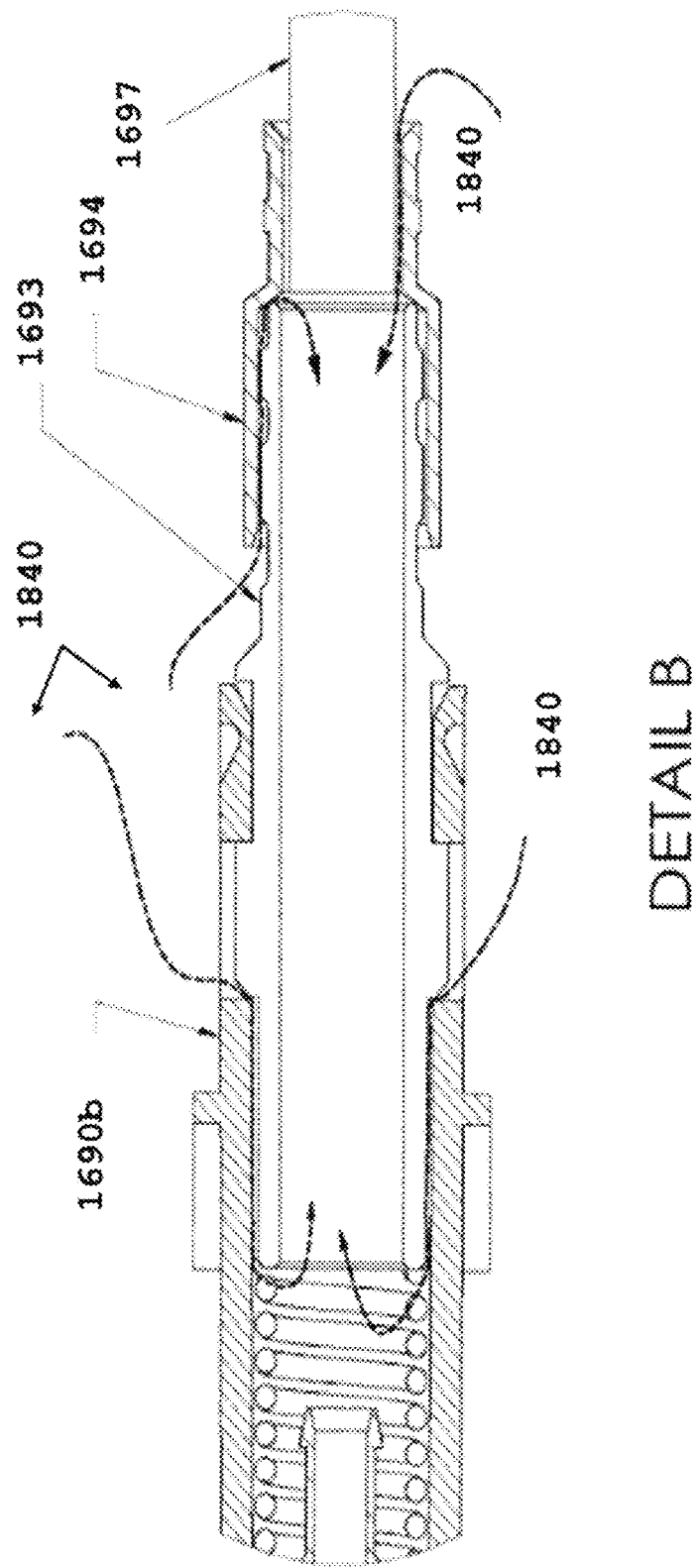

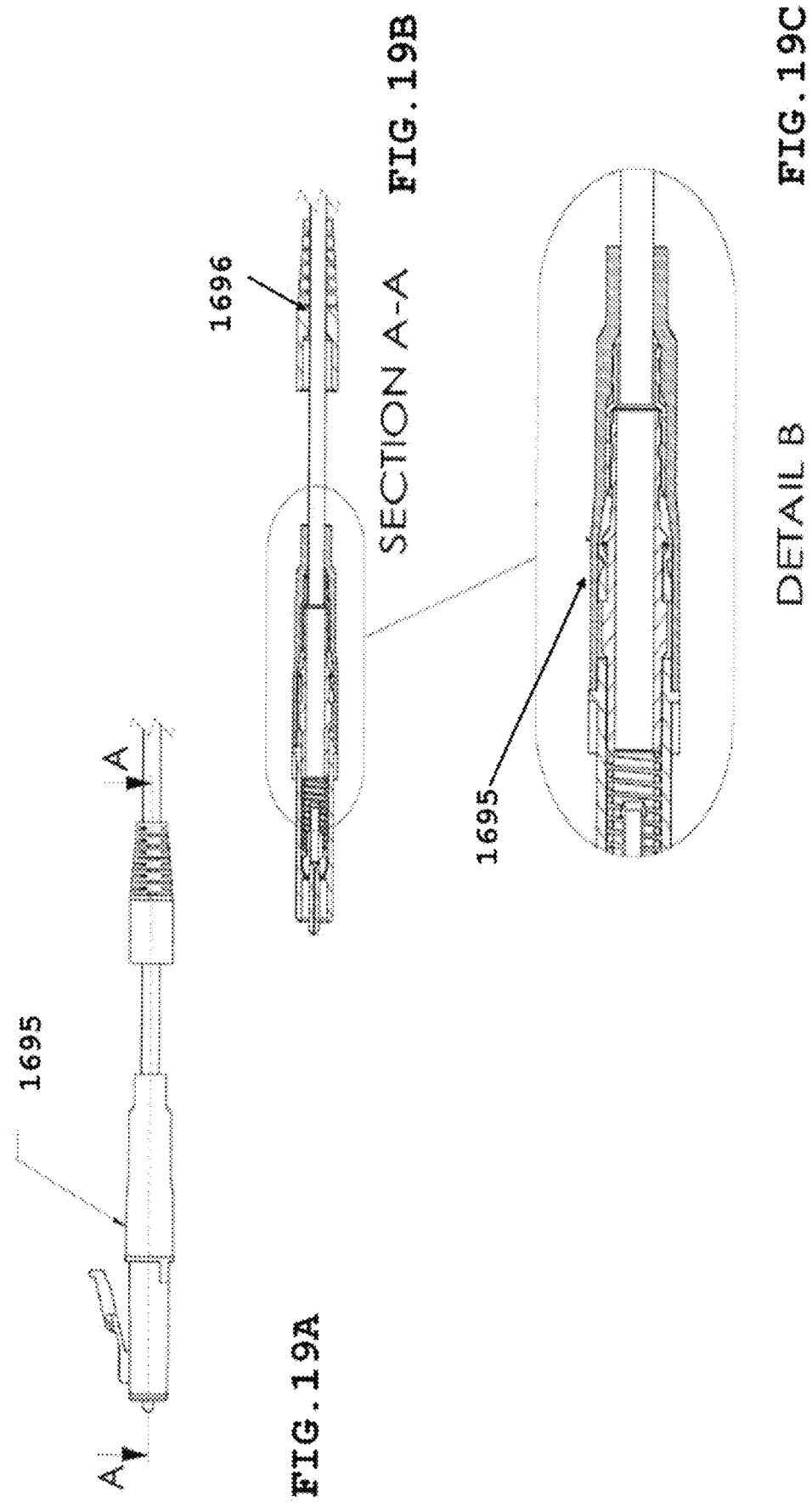

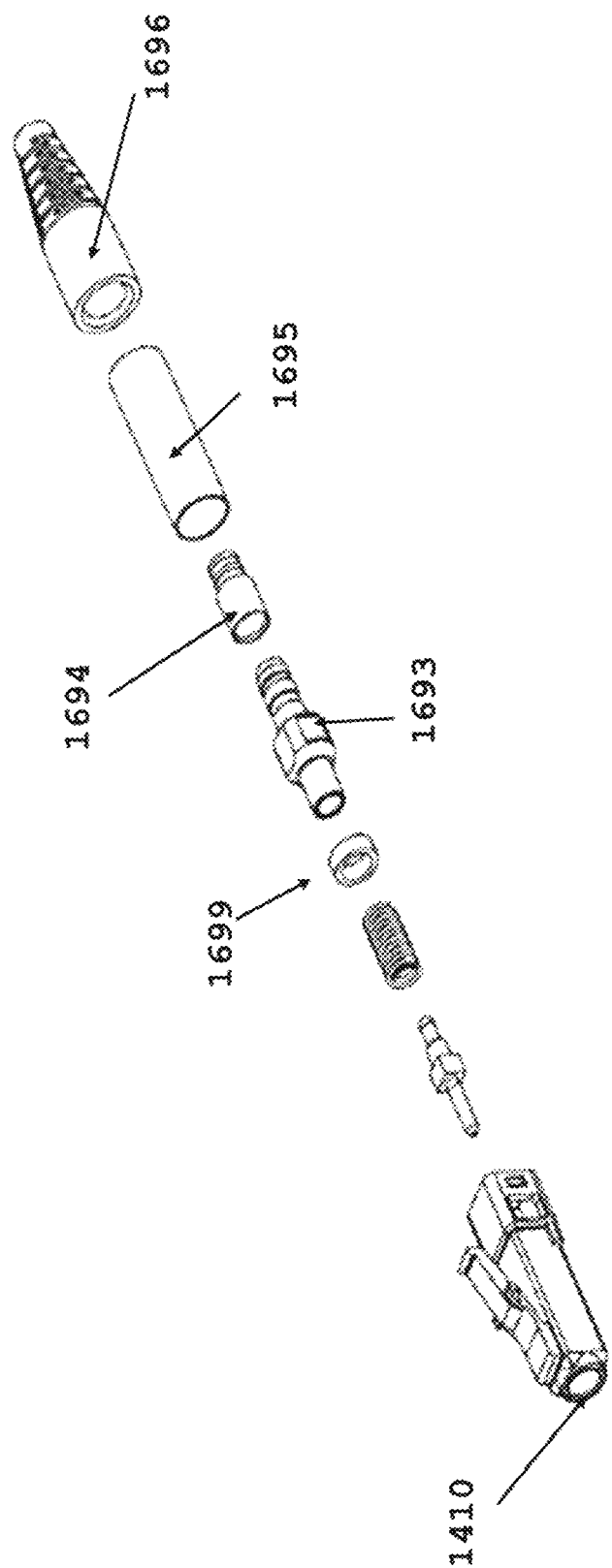

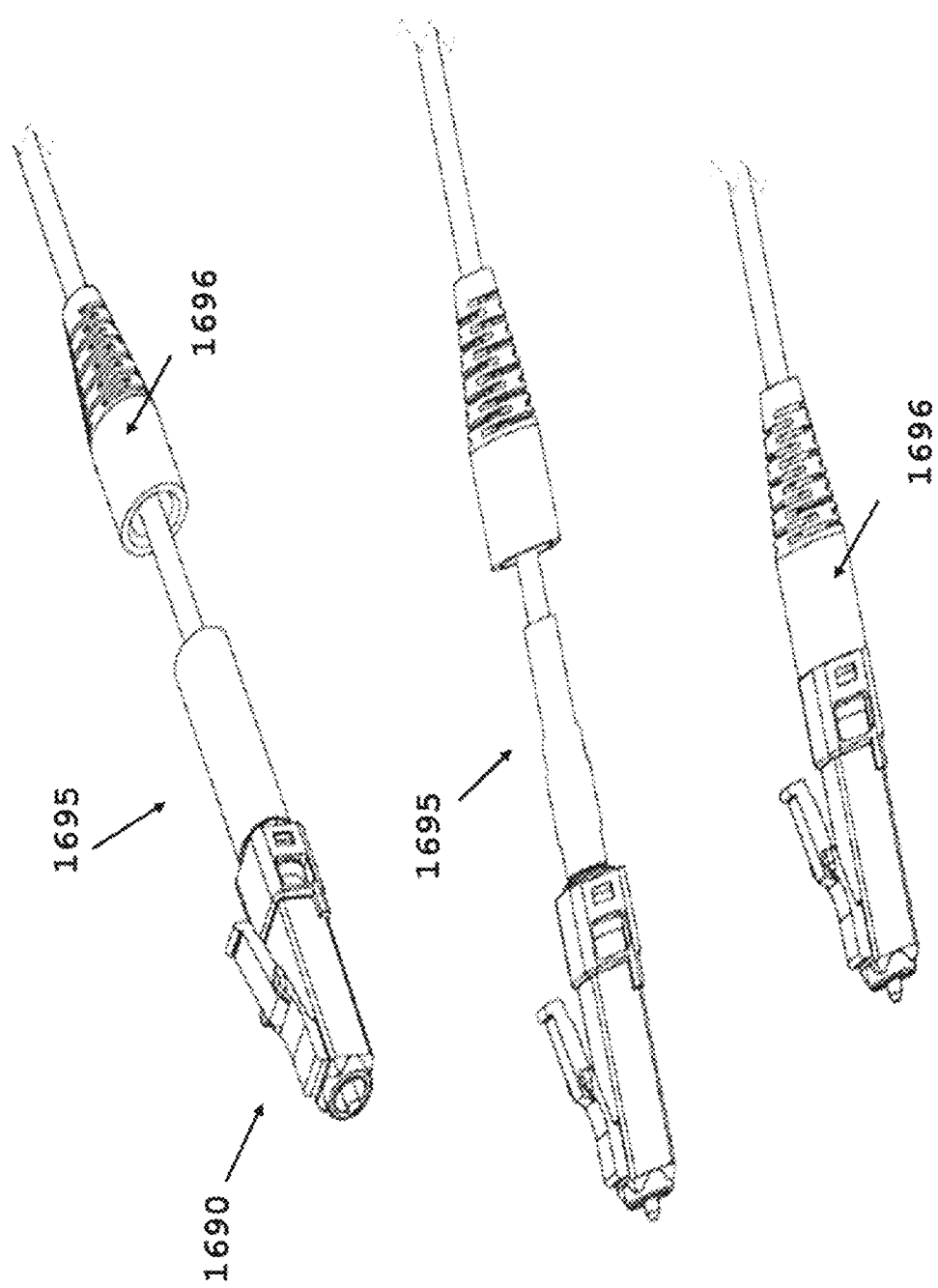
FIG.20B.1  FIG.20B.2  FIG.20B.3

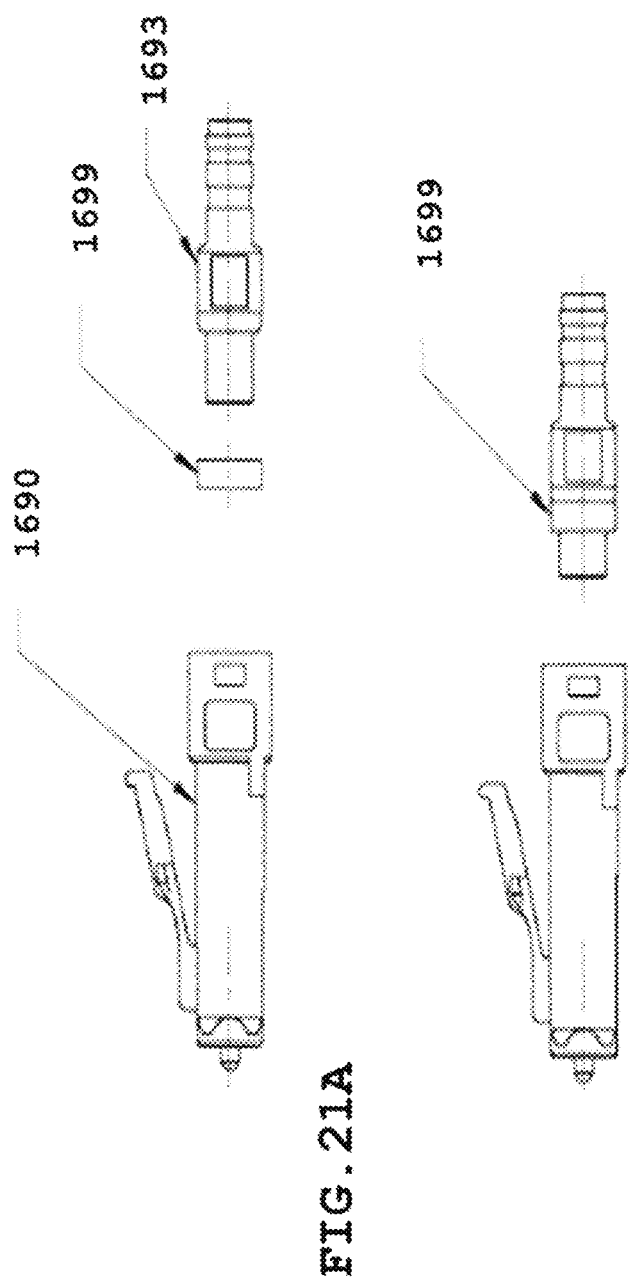

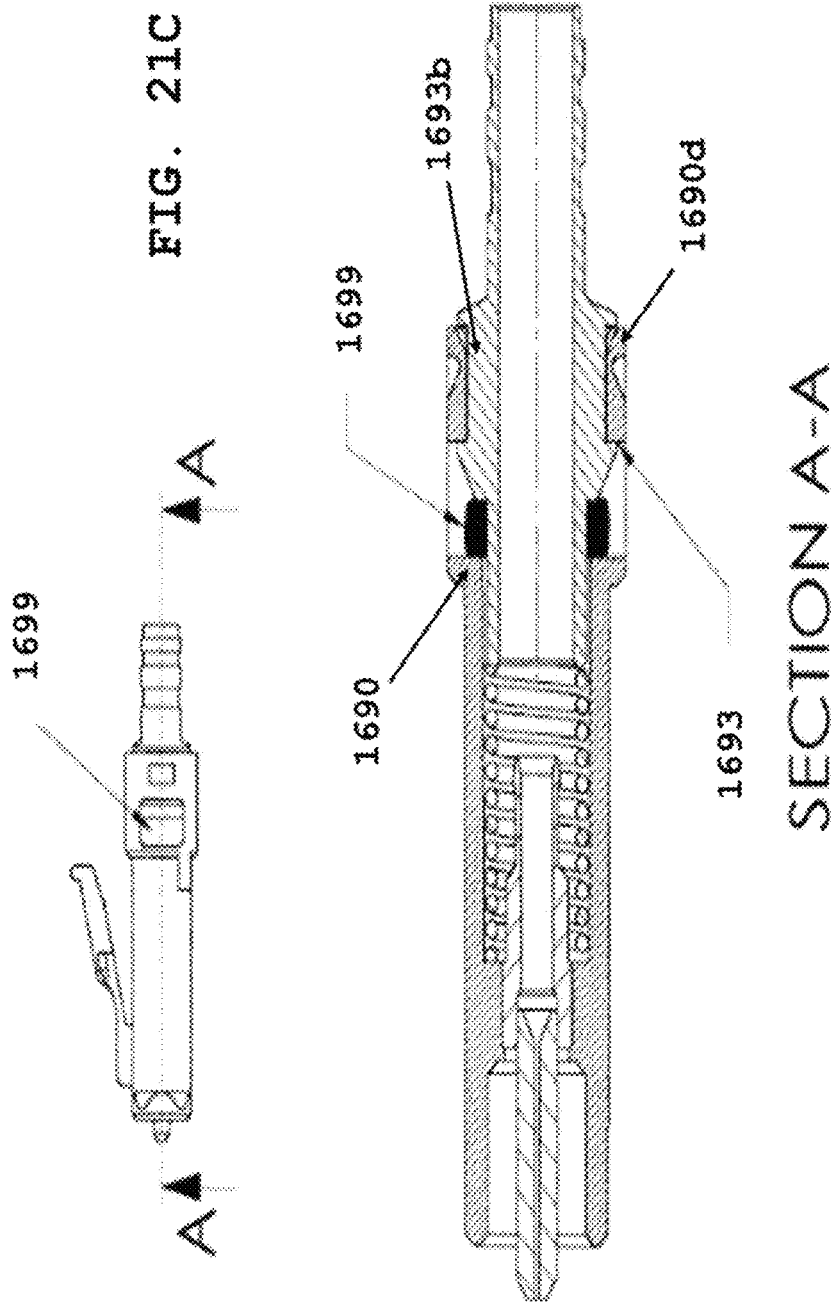

SECTION B-B

WATERPROOF FIBER OPTIC CONNECTOR ASSEMBLY AND METHOD OF USE

CROSS-REFERENCE TO RELATED APPLICATIONS

This application is a continuation of U.S. patent application Ser. No. 16/283,161 filed Feb. 22, 2019, titled "Waterproof Fiber Optic Adapter Assembly for Sealing a Fiber Optic Connector Against Moisture Ingress", which claims priority to U.S. Patent Application 62/644,011 filed Mar. 16, 2018, title "Waterproof Connector and Adapter System".

BACKGROUND

The present disclosure relates generally to fiber optic connectors, and more specifically to fiber optical connector and adapters having a waterproof seal to prevent moisture ingress.

The prevalence of the Internet has led to unprecedented growth in communication networks. Consumer demand for service and increased competition has caused network providers to continuously find ways to improve quality of service while reducing cost.

Certain solutions have included deployment of high-density interconnect panels. High-density interconnect panels may be designed to consolidate the increasing volume of interconnections necessary to support data networks in a compacted form factor, thereby increasing quality of service and decreasing costs such as floor space and support overhead. However, the deployment of high-density interconnect panels have not been fully realized. The computer rooms need to be cooled to keep humidity levels low to prevent moisture build up that interferes with signal quality.

Outside of the environmental controlled data center, the use of fiber optic connectors and adapters are subject to wide varying conditions from rain, high humidity, and costal salt air. These devices are used underground, in basements, cellars and telephone poles where moisture stays for months and months without drying out. Upon a connector or adapter failure, access is difficult and it is time consuming to determine which connector/adapter system unit failed.

SUMMARY

Embodiments disclosed herein address the aforementioned shortcomings by providing optical fiber connectors and adapters that have an effective and low cost sealing components without compromising the essential features of a small form factor or meeting industry standard dimensions and performance requirements.

In summary, the present disclosure provides an optical fiber connector with sealing components that substantially prevents moisture ingress into the ferrule tip or fiber optic communication path. The connector has a polymer/rubber seal that is also a heat shrinkable tube with an adhesive inside lining that covers a back portion of the connector plug frame, crimp ring, back body and spring including a portion of a boot that accepts a cable having fiber. The adapter comprises an alignment sleeve that accepts a rubber/polymer gasket that is compressed by a proximal end of the connector plug frame or similar structure to form a moisture seal.

The present disclosure also provides a rubber seal washer that is formed to fit against the adapter flange face. Upon securing the adapter against a module face plate that holds an array of adapters, the washer is compressed and seals out moisture and other debris.

Further presented herein is a system having both an optical fiber connector and an optical fiber adapter with sealing components to prevent moisture ingress via the connector or adapter into the fiber optic communication path.

The foregoing, as well as additional objects, features and advantages of the present disclosure will be more apparent from the following detailed description, which proceeds with reference to the accompanying drawings.

BRIEF DESCRIPTION OF THE DRAWINGS

FIG. 2A is a bottom view of FIG. 1B, with a cross section at B-B.

FIG. 2B is cross-section B-B showing a representative moisture path (along dotted line) into a cavity containing a ferrule having an optical fiber forming a fiber optic signal path with an opposing optical fiber (not shown).

FIG. 4B is a cross-section cut away along a X-Y axis, similar to FIG. 4A, where connector is fully seated with seal.

FIG. 10A is an exploded view of an adapter of the present invention.

FIG. 10B is an assembled view of an adapter of the present invention.

FIG. 12A.1 is a perspective exploded view of an adapter with sleeve seals.

FIG. 12A.2 is a partial exploded view of an adapter further showing cross-sections A-A and B-B, according to the present invention.

FIG. 12B is a cross-section view A-A prior to the installing the seal over an alignment sleeve holder.

FIG. 12C is cross section view B-B after a seal washer is installed over an alignment sleeve holder, according to the present invention.

FIG. 13A.1 is a perspective, exploded view of an adapter according to the present invention with a washer-seal just prior to placement at a face of an adapter flange according to the present invention.

FIG. 13A.2 is side view of FIG. 13A.1.

FIG. 13B depicts cut-away point C-C of the washer-seal secured up against the face of the flange of the adapter of FIG. 13A.

FIG. 13C is section C-C view showing a distance of washer-seal compression after insertion of connector within adapter receptacle.

FIG. 14A is a perspective view of an adapter according to the present invention secured to a module face plate.

FIG. 14B is a perspective view of an adapter on each side of a module face with an edged connector tip call out just prior to insertion in adapter receptacle according to another embodiment of the invention.

FIG. 14C is a zoomed view of the edged connector tip and connector tip bore.

FIG. 14D is an exploded view of FIG. 5 seal prior to accepting edge connector tip of FIG. 14C, as assembled in FIGS. 3-4.

FIG. 15A is a perspective view of the edged connector tip connector inserted into an adapter receptacle according to the present invention.

FIG. 15B is a cross section D-D of FIG. 15A.

FIG. 15C is a zoomed view of FIG. 15B.

FIG. 16B.1 is a perspective view of an edged tip connector of FIG. 16A with a heat shrink tubing attached just prior to securing a boot.

FIG. 16B.2 is FIG. 16A with the tubing shrunk.

FIG. 16B.3 is a perspective of boot secured to the heat shrink tubing of FIG. 16B.2.

FIG. 17A is a side view of an edged tip connector partially assembled illustrating the tubing and boot prior to assembly.

FIG. 17B is the section A-A perspective view of FIG. 17A.

FIG. 18 is the call-out detail "B" of FIG. 17B showing a moisture path through an assembled connector.

FIG. 19A is a side view of the connector of FIG. 18 with a heat shrink tubing attached according to the present invention.

FIG. 19B is a section view A-A of FIG. 19A, illustrating the adhesive inner lining covering moisture ingress points.

FIG. 19C is call-out detail "B" of FIG. 19B.

FIG. 20A is an exploded view of the connector of FIG. 16 according to the present invention.

FIG. 20B.1 is a perspective view of the connector of FIG. 20A with a heat shrink tube attached prior to securing a boot.

FIG. 20B.2 is a perspective view of FIG. 20B.1 with heat shrink tubing secured after heating.

FIG. 20B.3 is a perspective view of FIG. 20B.2 with the boot secured over the back body.

FIG. 21A is a partially exploded view of another connector embodiment showing a rubber washer seal prior to insertion onto a back-post.

FIG. 21B is FIG. 21A with the rubber washer installed onto a back-post.

FIG. 21C is shows cut-line "A-A" of FIG. 21B assembled.

FIG. 21D is a cross section view "A-A" of the rubber washer of FIG. 21B assembled as a connector with the washer compressed.

DETAILED DESCRIPTION

This disclosure is not limited to the particular systems, devices and methods described, as these may vary. The terminology used in the description is for the purpose of describing the particular versions or embodiments only and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The following terms shall have, for the purposes of this application, the respective meanings set forth below.

A "connector," as used herein, refers to a device and/or components thereof that connects a first module or cable to a second module or cable. The connector may be configured for fiber optic transmission or electrical signal transmission. The connector may be any suitable type now known or later developed, such as, for example, a ferrule connector (FC), a fiber distributed data interface (FDDI) connector, an LC connector, a mechanical transfer (MT) connector, a square connector (SC) connector, an SC duplex connector, or a straight tip (ST) connector. The connector may generally be defined by a connector housing body. In some embodiments, the housing body may incorporate any or all of the components described herein.

A "fiber optic cable" or an "optical cable" refers to a cable containing one or more optical fibers for conducting optical signals in beams of light. The optical fibers can be constructed from any suitable transparent material, including glass, fiberglass, and plastic. The cable can include a jacket or sheathing material surrounding the optical fibers. In addition, the cable can be connected to a connector on one end or on both ends of the cable.

The terminal ends of a cable may include a connector used to connect the cable with another cable or other fiber optic devices. A connector may include a housing structure configured to interact with and connect with an adapter. An adapter, among other things, may include two aligned ports that align fiber optic connectors and/or electrical connectors therein. The adapter may be used, for example and without limitation, to align and connect optical fibers end-to-end or to allow for pin/socket electrical connections.

Figure 1A:
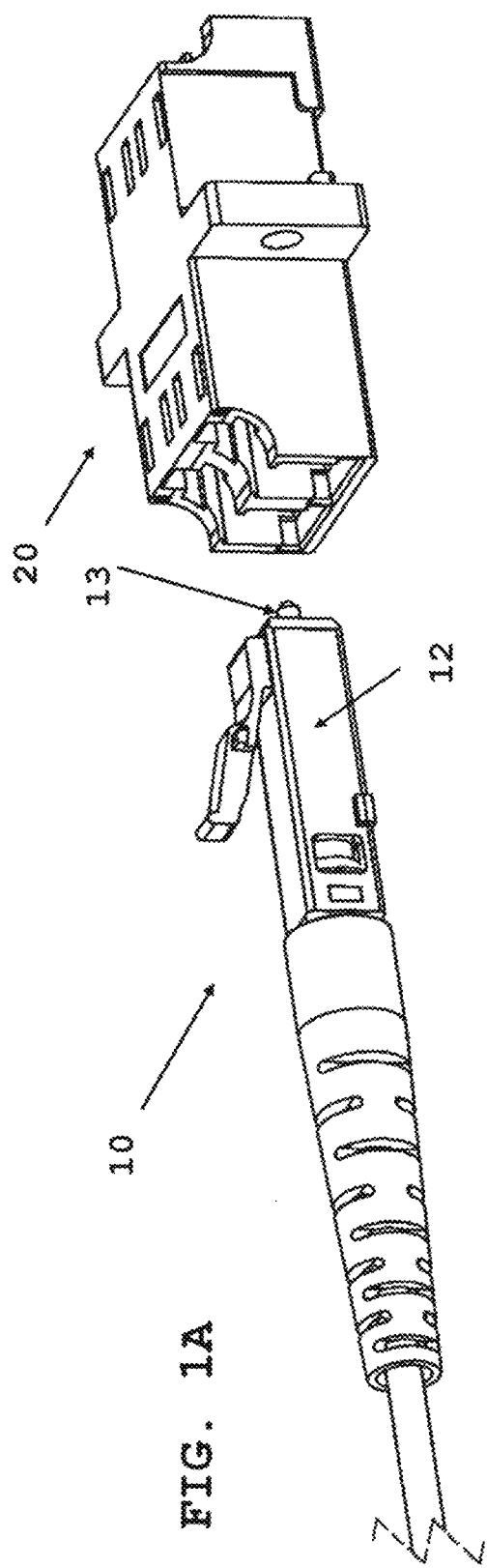
FIG. 1A is a perspective view of a standard fiber optic connector prior to insertion into a standard adapter.
Figure 1B:
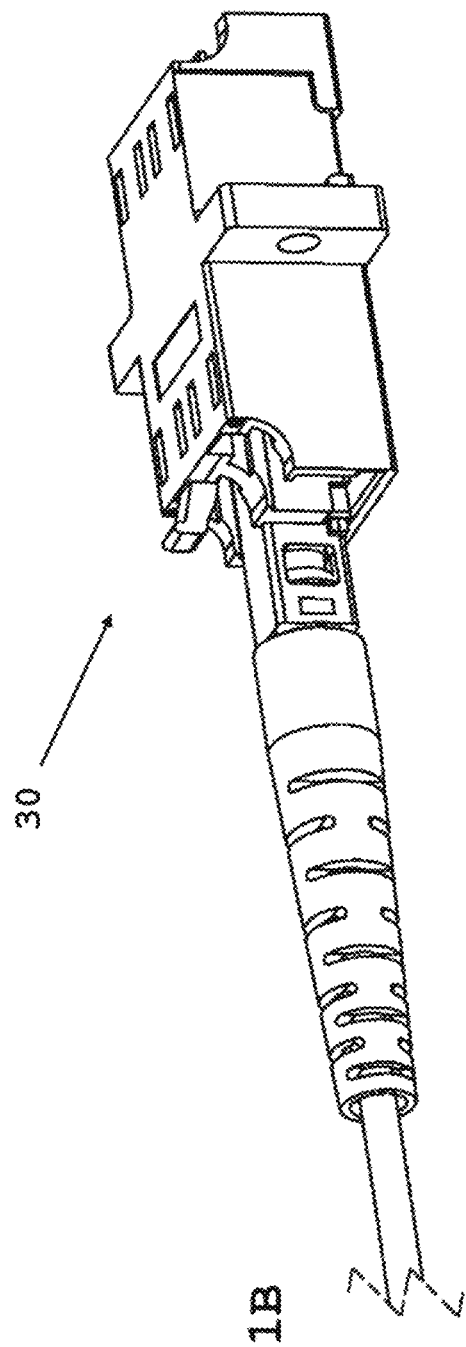
FIG. 1B is a perspective view of a standard fiber optic connector inserted into a standard adapter.

Referring to FIGS. 1A and 1B, standard fiber optic connector (10) with plug frame (12) is shown prior to insertion into standard adapter (20). The plug frame (12)

holds ferrule (13) with a fiber optic signal path (not shown). In FIG. 1B, standard connector (10) is inserted into adapter (20), called a connector and adapter system (30). Referring to FIG. 2A, connector and adapter system (30) is shown from a bottom view, with a cut-line B-B. FIG. 2B is a cross-section view along B-B of FIG. 2A. FIG. 2B illustrates a possible moisture path (40) where moisture and debris, likely in the form of humidity and suspended particles, ingresses into a space (42) of plug frame (12) and other assembled components therein such as ferrule (13) of connector (10) (refer to FIG. 1A.) This moisture suspension then condenses onto the fiber optics and interferes with the light signal. It is known in the art that light is bent and distorted as it moves through air and fiber due to the refractive index of the media. Humid air with suspended particles has a bends light and distorts a light signal exiting an optical fiber from a first ferrule prior to entrance into a second optic fiber. Fiber optic cables comprising optical fiber, coating, cladding and cable jacket are designed for with a specific numerical aperture. If this aperture is distorted by moisture or debris, then a significant loss of optical signal can occur. Since the optical signal contains data or information in the form of wavelengths of light, the loss of light means loss of data.

Figure 3:
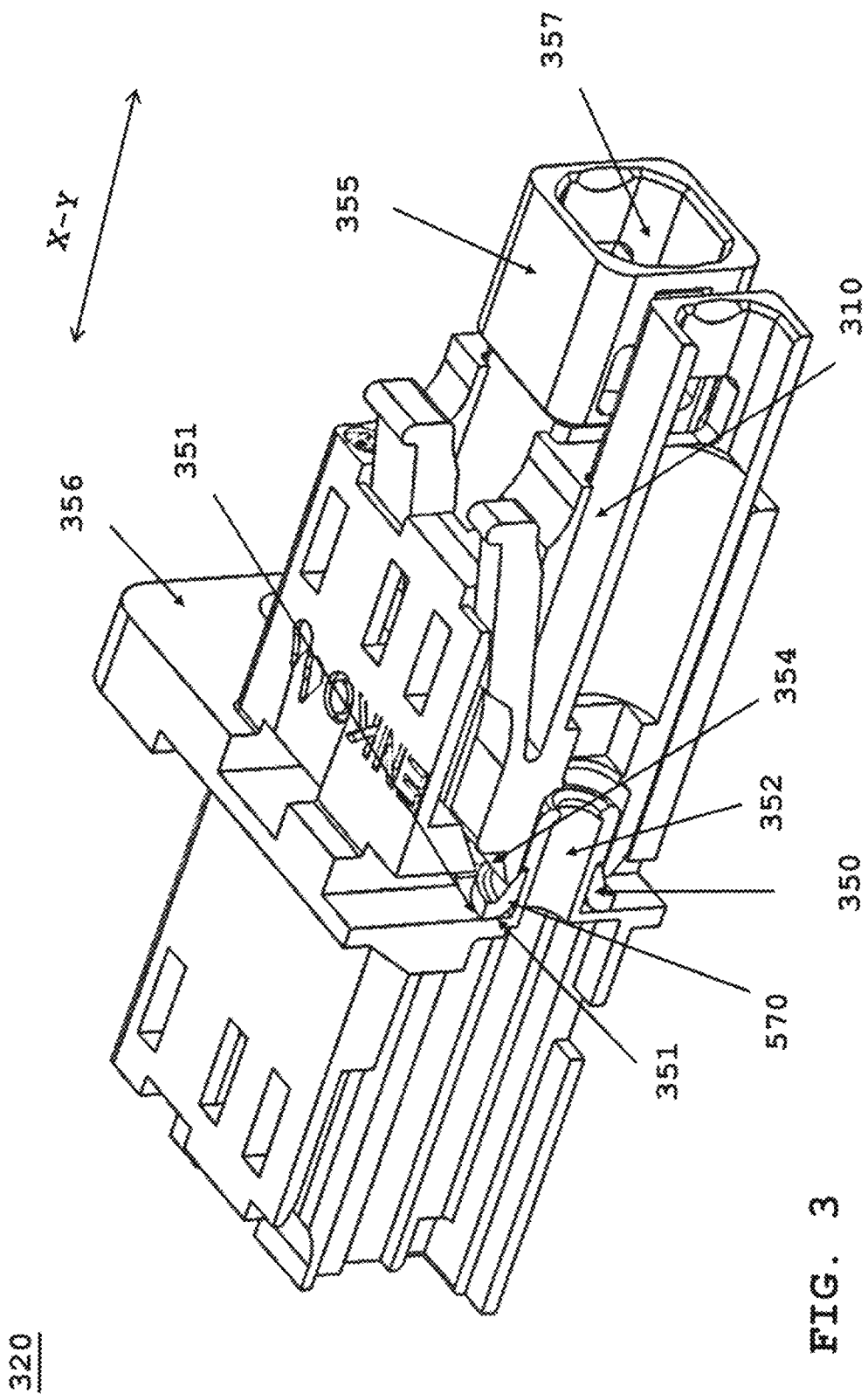
FIG. 3 is a cutout view along a X-Y axis of the connector inserted into an adapter just prior to compressing a seal according to the present invention.
Figure 4A:
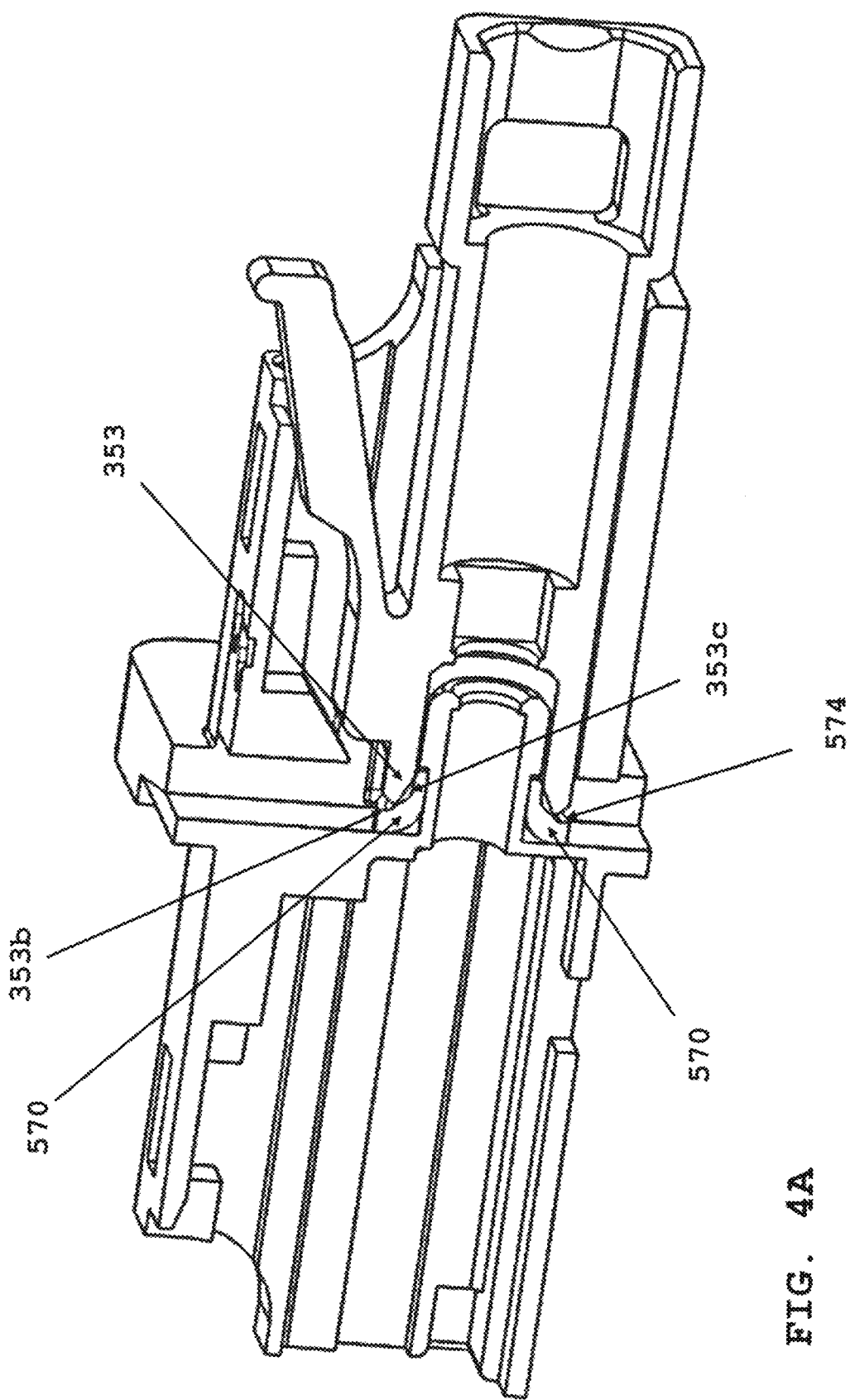
FIG. 4A is a cross-section cut away along a X-Y axis of the connector inserted into the adapter and the proximal end of a connector plug frame or leading surface of the connector tip is compressing a seal according to the present invention.

Referring to FIG. 3, a cross section of a connector (310) is shown inserted into adapter (320) of the present invention. Unlike adapter (20), adapter (320) further comprises sleeve seal (570) positioned circumferential around alignment sleeve holder (352). Sleeve seal (570) abuts a back wall of the adapter. This provides a sealing surface (351) that helps prevent moisture and debris ingress. Proximal end (354) of edged connector (310) tip (353) mates and compresses sleeve seal surface (574), as illustrated in FIG. 4A. Distal end (355) of the edged connector (310) provides a surface to apply heat shrink tubing (1695) to provide improve moisture sealing as described in FIG. 17A below. Still referring to FIG. 3, a cable containing the optical fibers is inserted at opening (357), or a distal end of the edged connector (310). Adapter flange (356) provides another sealing surface as described herein at FIG. 3, to prevent further moisture and debris ingress as described at FIGS. 11 and 11A.

Referring to FIG. 4A, edged connector tip (353) has sealing faces (353b) and (353c) configured to mate with sleeve seal surface (574) to help prevent moisture and debris ingress into space or cavity (42) (refer to FIG. 2B). In this FIG. 4A, the edged connector tip is compressing the sleeve seal to form a seal against moisture and debris ingress. Referring to FIG. 4B, sleeve seal (570) is retained on an alignment sleeve cutout (355a). Cutout (355a) is configured to accept sleeve seal (570) corresponding to a connector type such as MPO, CS, SN, SC or LC. The connectors are depicted in FIGS. 23A-23E and the corresponding adapters are depicted in FIG. 24A-24E.

Figure 5:
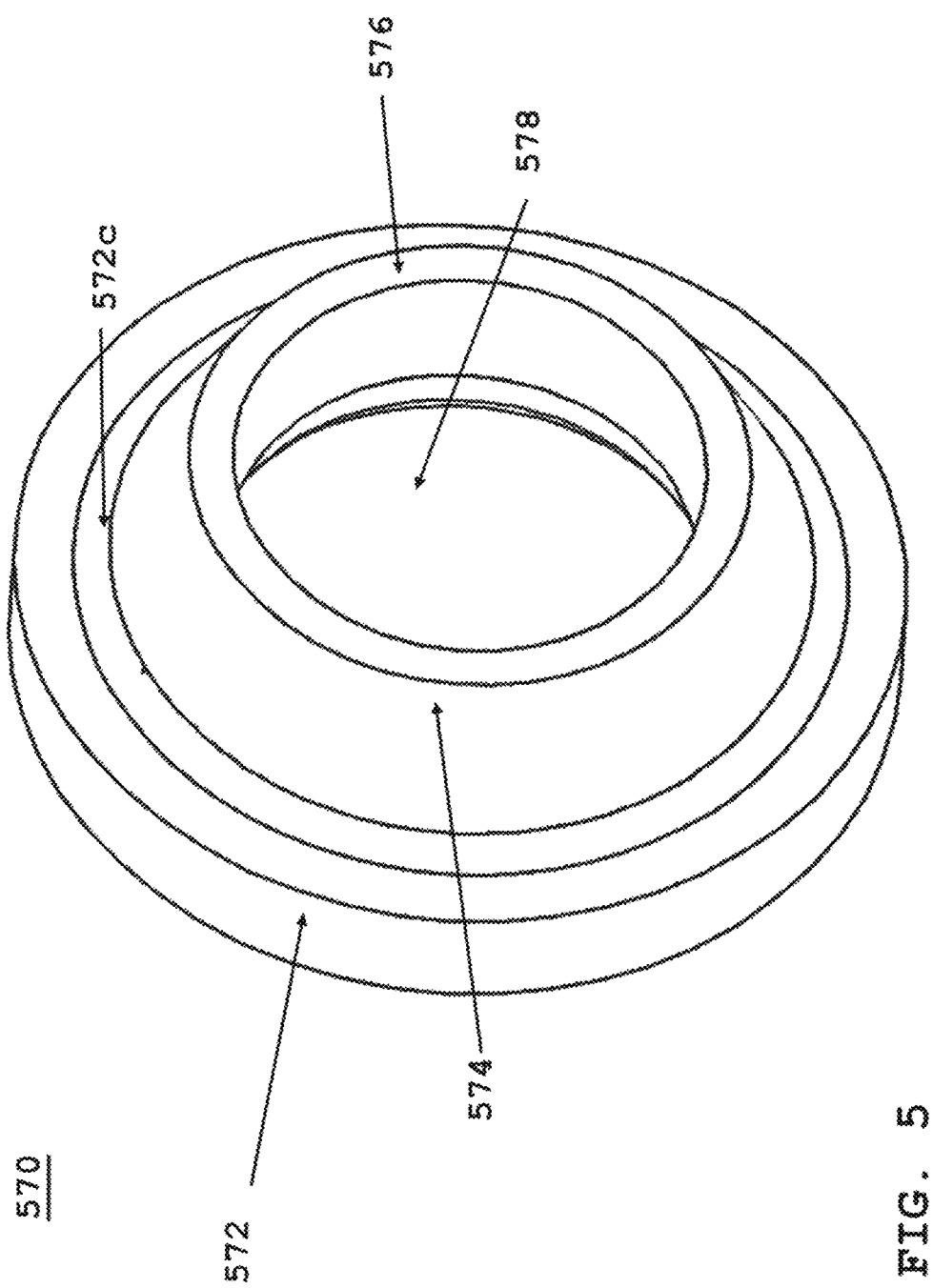
FIG. 5 is a perspective view of a seal according to the present invention.
Figure 6:
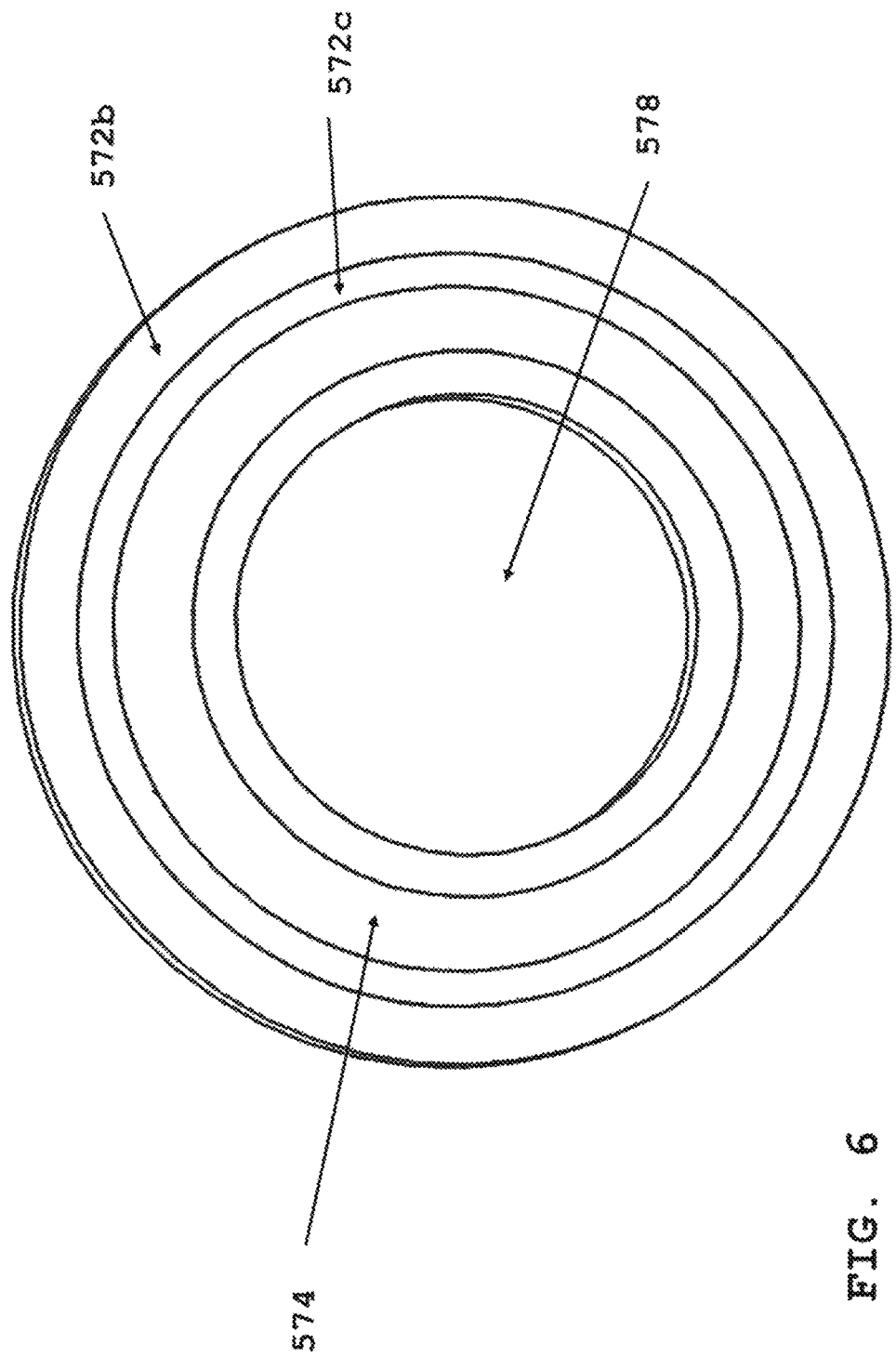
FIG. 6 is a front view of the seal of FIG. 5.

Referring to FIG. 5 through FIG. 9, various views of the sleeve seal are shown. In FIG. 5, sleeve seal (570) includes sealing surface (574) configure to mate with edged connector tip (353). Sealing surface (574) may be configured to mate with a MPO ("multi fiber push on") edged connector tip rather than the edged connector tip of a LC "Lucent Connector" type, as disclosed in the present invention. Sleeve (570) includes bore (578) that is sized and shaped to go over an outer circumference of alignment sleeve (352), with sleeve bore (578) inner diameter sized to create a seal with the outer diameter of the alignment sleeve (352). An outer flange (572) is sized to provide an additional sealing surface with an alignment sleeve back plate, and flange (572) rests in alignment sleeve cut-out (353a). Sleeve seal face (576) (also called primary face seal) is sized to fit into a circumferential opening, or a bore (1420) at a proximal end of edged connector tip (1410) (refer to FIG. 14D) to provide an additional seal against moisture or debris ingress into cavity (42) containing the ferrule and fiber optic signal path. Referring to FIG. 6, flange (572) first face (572b) and second face (572c) are configured to engage edged connector tip surfaces (353b, 353c) (refer to FIG. 4A) to form a seal.

Figure 7:
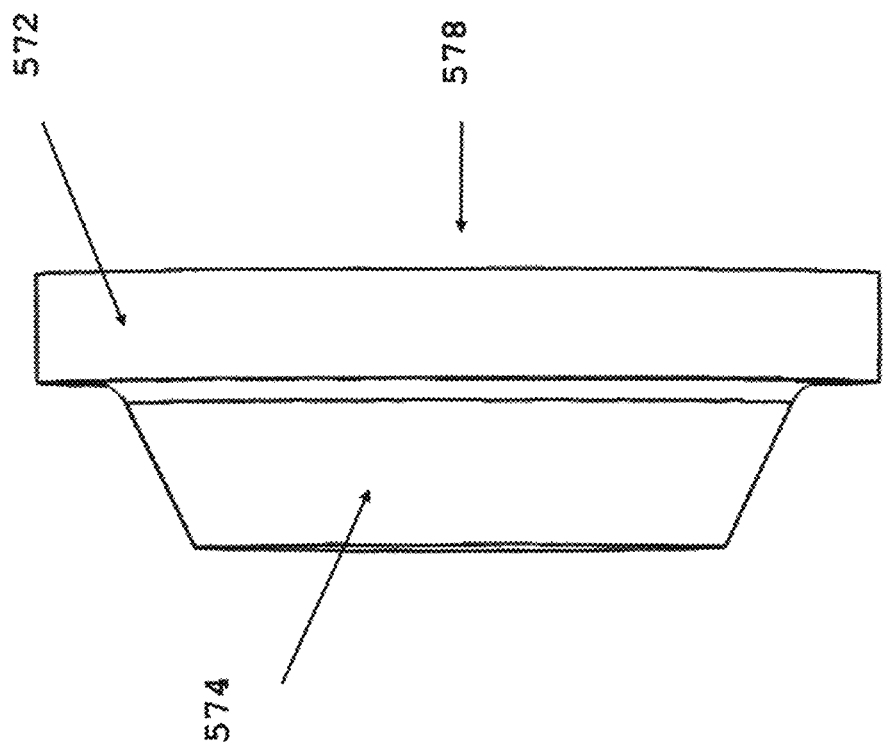
FIG. 7 is a side view of FIG. 5.
Figure 8:
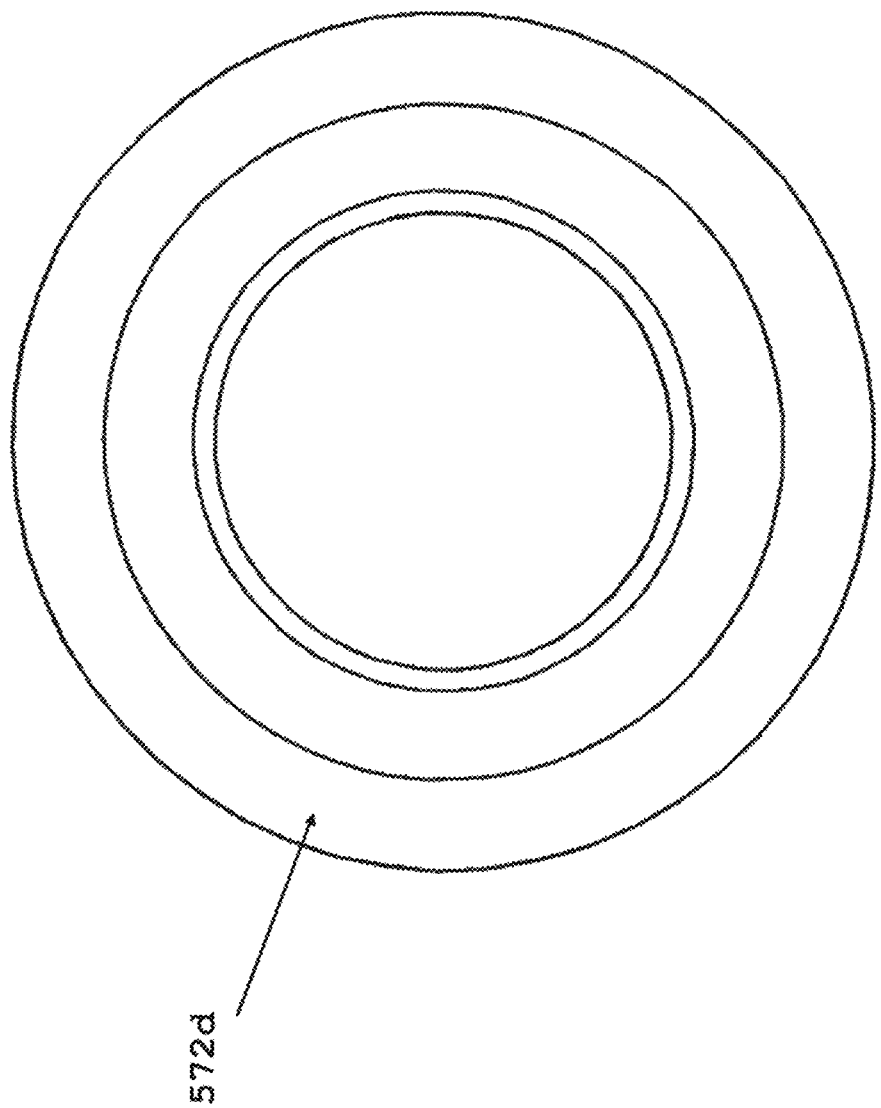
FIG. 8 is the rear view of FIG. 5.
Figure 9:
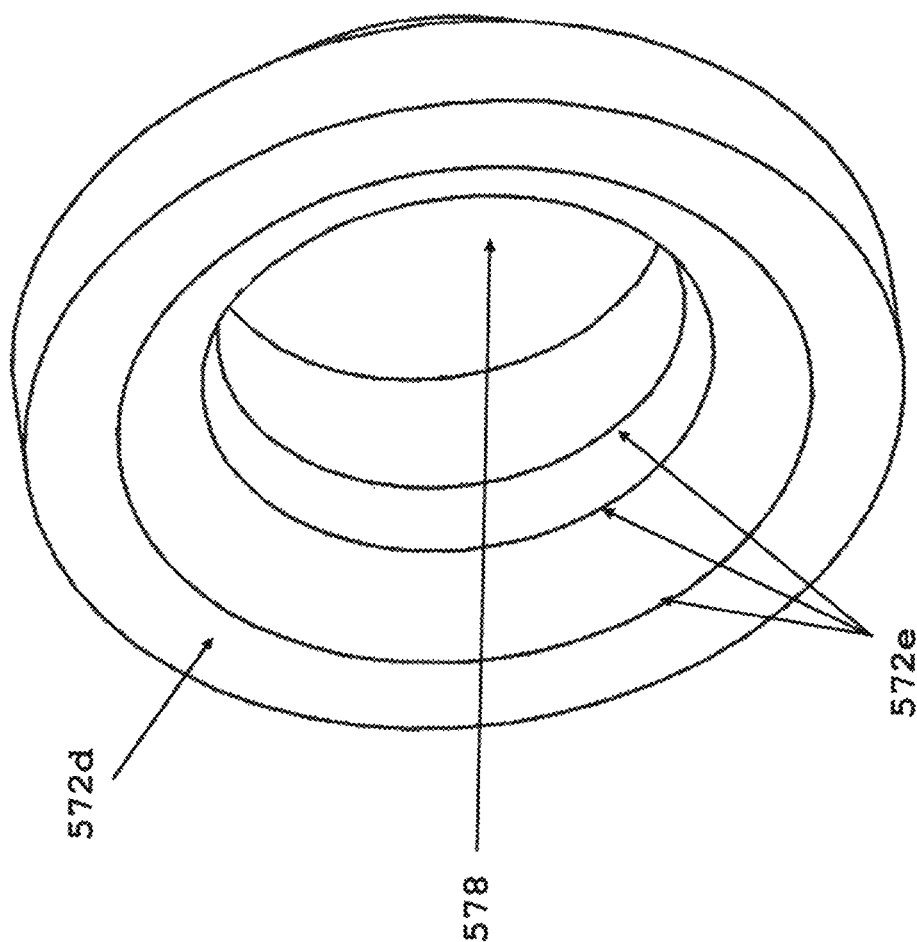
FIG. 9 is a perspective view of FIG. 8.

Referring to FIG. 7, side view of the sleeve seal (570) shows flange (572) is sized to provide lateral strength, which sleeve seal surface (574) is configured to compress to flange (572) and mate with edged connector tip (353) to form a seal. Referring to FIG. 8, back face (572d) of flange (572) provides an additional sealing surface that mates with backplate (23b) of alignment sleeve holder (23)(refer to FIG. 11B). FIG. 9 is a back face (572d), side view of sleeve seal (570) illustrating the inner diameter is sized and configured, with possible striations (572e) to seal up against the outer diameter of the alignment sleeve (23).

Figure 11A:
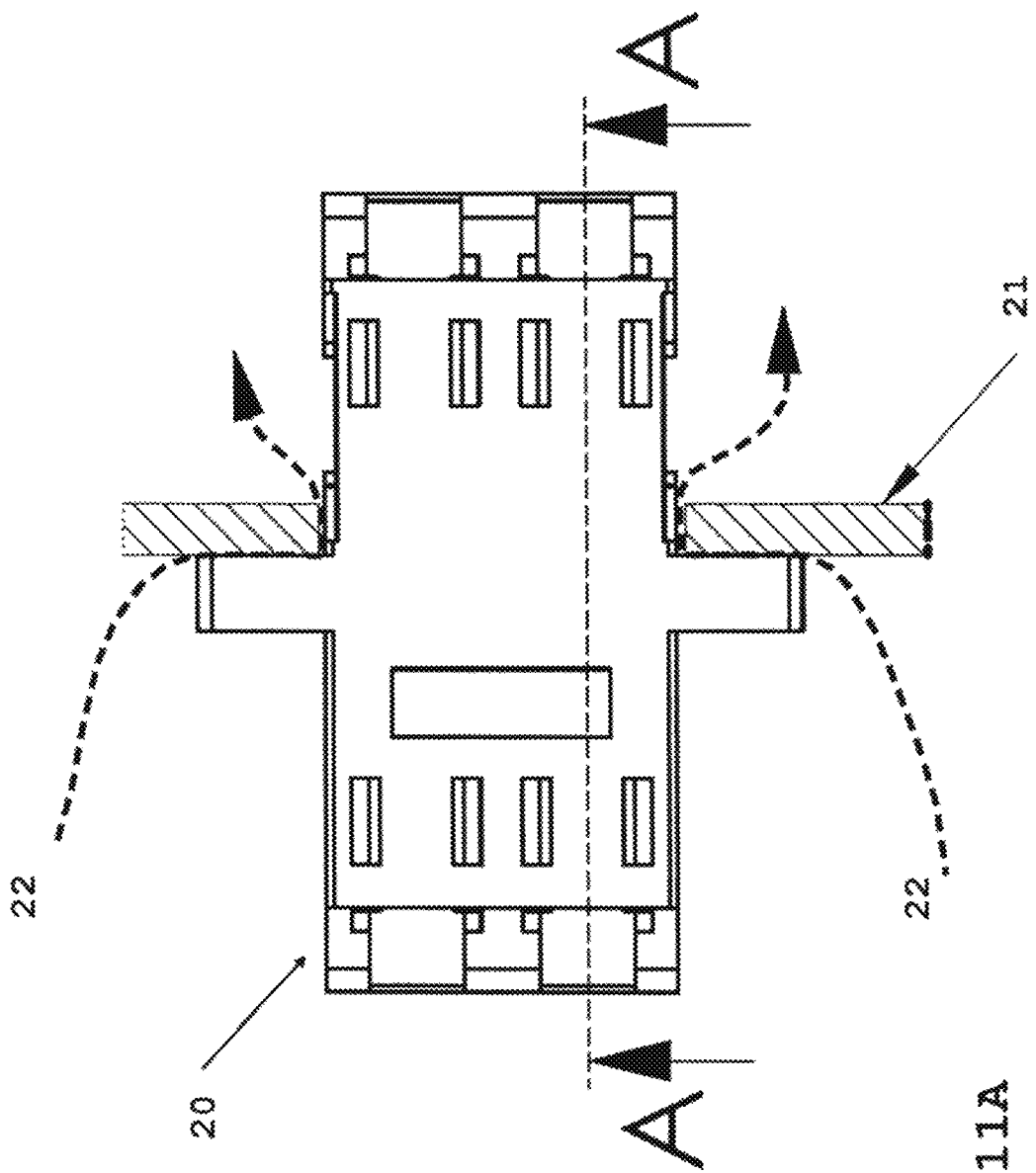
FIG. 11A is a bottom view of an adapter illustrating a moisture path of the present invention.
Figure 11B:
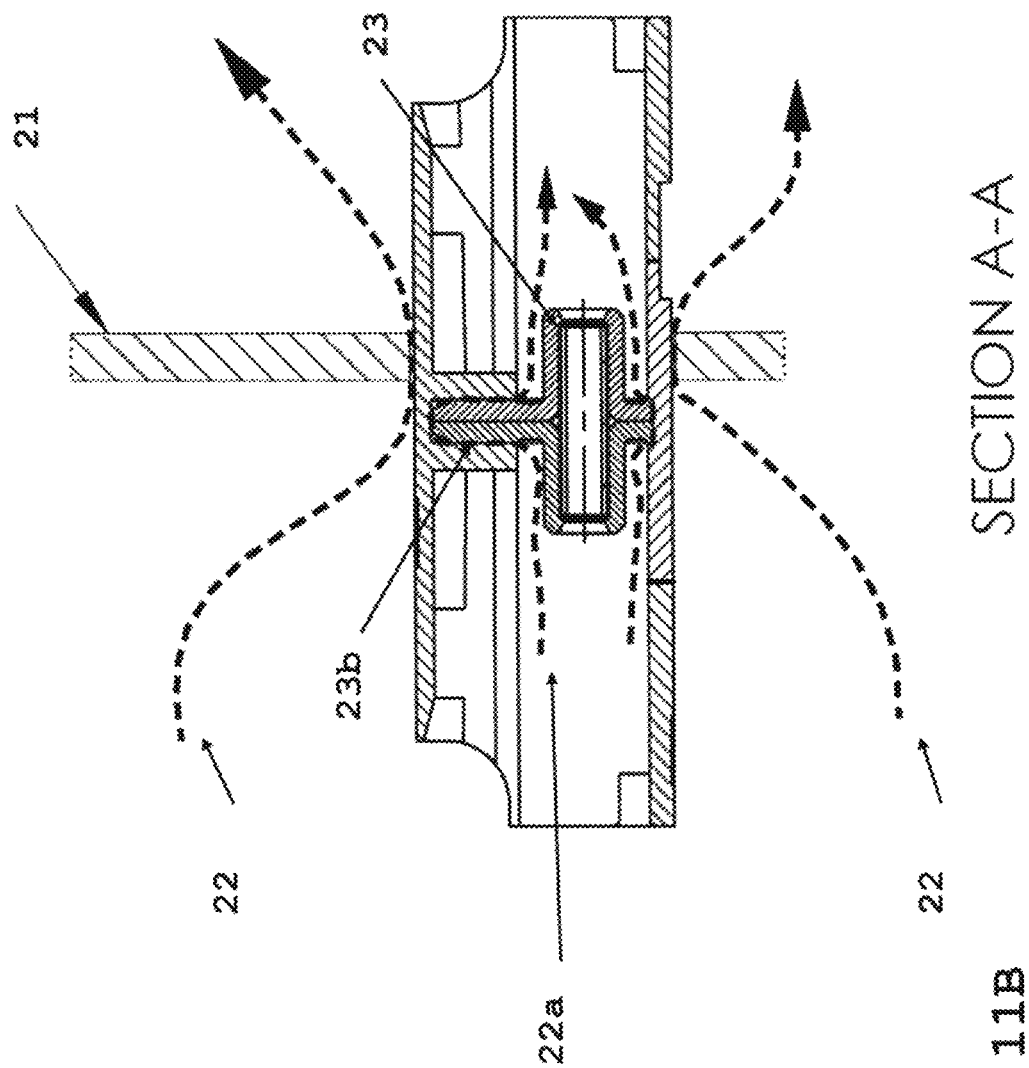
FIG. 11B is a cross-section A-A of FIG. 11A illustrating a moisture path of the present invention.

Referring to FIG. 10A and FIG. 10B, a standard adapter is shown in an exploded view and assembled view respectively. Adapter housing (21) contains alignment sleeve backplate (23b), alignment sleeve holder (23), alignment sleeves (25), base plate (29) and base screws (27). FIG. 10B depicts FIG. 10A adapter (20) assembled. Referring to FIGS. 11A and 11B, FIG. 11B is the cross section A-A of FIG. 11A, a standard adapter similar to FIG. 10B, where FIG. 11B illustrates the likely moisture path (22a) around and through the alignment sleeve back-plate (23b). FIG. 11A depicts a moisture path (22) between panel and adapter (20) flange. Adapter (20) is mounted to a panel front plate (21).

Referring to FIGS. 12A.1, 12A.2, 12B and 12C, an embodiment of the present invention illustrates inserting sleeve seal (570) over the alignment sleeve holder (23) along the cross section A-A of FIG. 12A.2 at FIG. 12B. FIG. 12C is inserted sleeve seal (570) over alignment sleeve holder (23) along cross section B-B of FIG. 12A.2 at FIG. 12C. Seal (570) is shown prior to insertion at FIG. 12B and inserted over alignment sleeve holder (23) at FIG. 12C. FIG. 12A.1 depicts adapter (320) with sleeve seal (570) in an exploded view.

Referring to FIGS. 13A-C, another embodiment of the adapter is shown. Seal washer (28) is inserted over the outer surface of adapter (320) and against the adapter flange, as shown in FIGS. 13A.1 and 13A.2. FIG. 13B is a cross section along C-C of FIG. 13A, and FIG. 13C shows washer (28) compression distance (28b) against the flange face when the adapter is secured to a module face plate as shown in FIG. 14A. Washer (28) is shown on one side of adapter (320), but may be placed on both sides of adapter (320) without departing from the scope of the present invention, at FIG. 14B. FIG. 14B shows edged connector tip (1410) around the tip of the connector. Edged connector tip (1410) mates with sleeve seal (570)(not shown) that is sized and shaped to fit into bore (1420) to provide an additional moisture seal. FIG. 14C is a zoomed view of edged connector tip (1410) and bore (1420) or circumferential opening. Edged connector tip (1410) may be a cylindrical extension of plug frame (12), or formed as part of proximal end of plug frame (12). Bore (1420) accepts primary flange face (576), and as connector is inserted further into adapter (320) (as depicted in FIG. 15B and FIG. 15C), edged connector tip (1410) accepts sleeve flange (576) along sealing surface (574) until connector edged tip (1410) abuts second surface (572c).

FIG. 14O depicts seal (570) prior to placement within bore (1420) and abutting edge connector tip face (1410a) to seal fiber optic connector (1400) at proximal end or ferrule end.

Dotted lines depicts second surface (572c) abutting face (1410a) and sealing surface (574) within bore (1420), when connector (1400) is fully inserted into an adapter (320) or similarly configured adapter of FIG. 24.

Referring to FIGS. 15A-C, the connector (1400) with sleeve seal (570), FIG. 12B, is shown inserted into adapter (320) at FIG. 15A. FIG. 15B section D-D of FIG. 15A shows edged connector tip (1410) compressing the sleeve seal (570). The zoomed view FIG. 15C of edged connector tip (1410) and adapter (320) with sleeve seal (570) more closely shows the compression of seal (570) by edged connector tip (1410), and seal (570) partially enters edged connector tip bore (1420). The ingress of the seal helps seal, within bore tip, against moisture and debris entering the space (42) as shown in FIG. 2B. Cylindrical edged connector tip (1410) compressed seal (570) up against inner structure of adapter receptacle providing a moisture or debris seal.

Figure 16A:
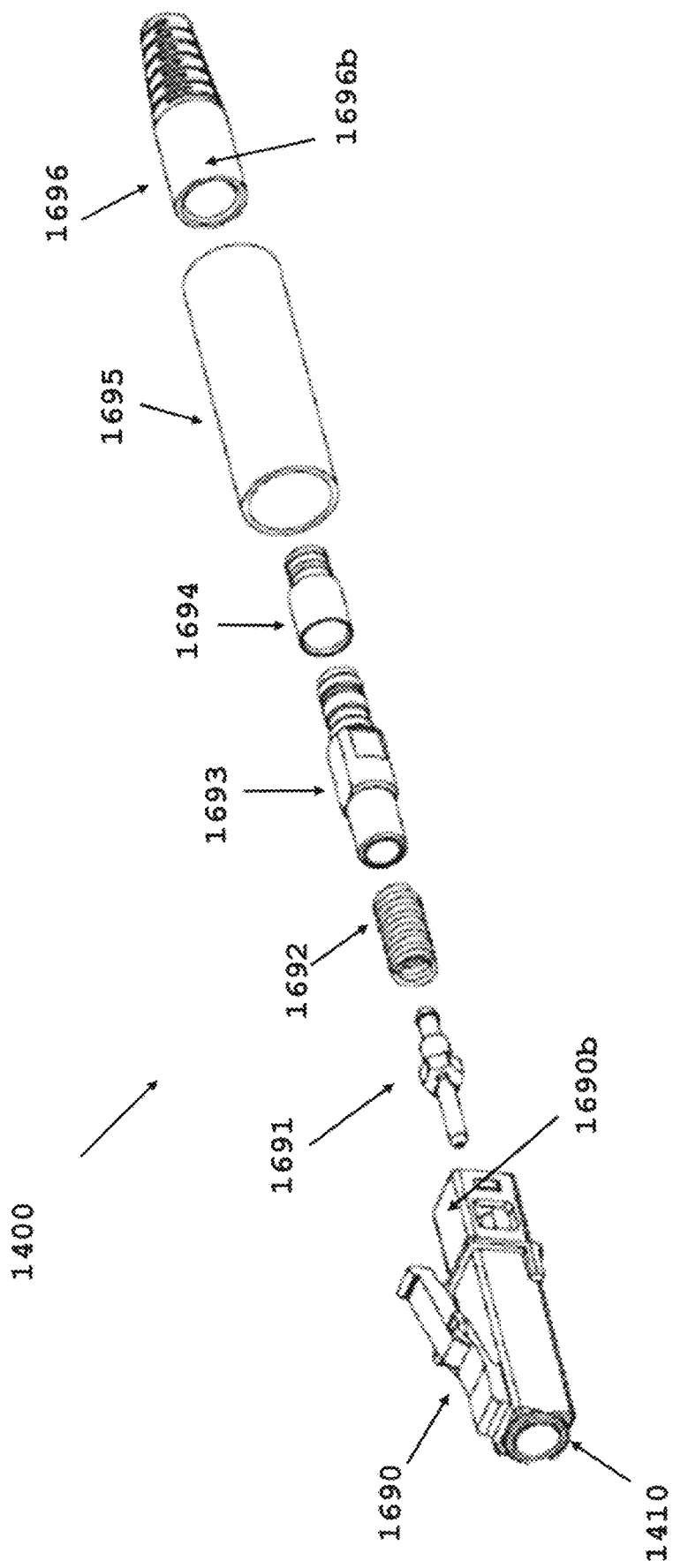
FIG. 16A is an exploded view of a fiber optic connector according to another embodiment of the present invention.

Referring to FIG. 16A, an exploded view of the connector (1400) is shown. In this embodiment, heat shrink tube (1695) is placed partially over distal end (1690b) of plug frame (1690) and partially over proximal end 1696b of boot (1696). Tubing (1695) covers and protects ferrule flange (1691), spring (1692), back-post (1693) and crimp ring 1694 from moisture ingress. Tubing (1695) may cover less connector components without departing from the scope of the invention. Referring to FIGS. 16B.1-16B.3, at FIG. 16B.1 tubing (1695) is positioned over the distal end of plug frame (1690) prior to applying heat. Referring to FIG. 16B.2, the tubing was heated and shrunk forming a seal about the crimp ring, which provides sealing surface (1694b) for boot (1696). Referring to FIG. 16B.3, boot (1696) is inserted over surface (1694b), and reheated to form a seal with the boot and resulting in connector (1600).

Referring to FIG. 17A, heat shrink tubing (1695) is shown prior to insertion over the crimp ring and plug frame (1690) and strain relief or boot (1696), shrink tubing overlaps a distance (1690c). Referring to FIG. 17B, cross section A-A, illustrates the components being sealed by heat shrink tubing (1695).

Referring to FIG. 18, detail B is a zoomed view showing moisture paths (1840) that heat shrink tubing (1695) forms a protective seal against moisture and debris. Moisture can enter between back-post (1693) and crimp ring (1694). Moisture can enter between connector body (1690b) and back-post (1693). Referring to FIG. 19A, the heat shrink tubing (1695) has been heated and shrunk. FIG. 19B is cross section A-A showing the heat shrunk tubing and boot (1696), the latter prior to insertion over the distal end of the connector. FIG. 19C is a zoomed view of FIG. 19B (i.e. Detail B), and the lower illustration is detail B, showing the heat shrink tubing (1695) applied to the connector. With added adhesive on the inside of the tubing, substantially all moisture paths are sealed.

Referring to FIG. 20A, another embodiment of a connector using heat shrink tubing (1695) is shown. This discloses an alternative back-post (1693) and crimp ring (1694), which does not change the scope of the present invention using the tubing (1695) to seal moisture/debris paths. In this embodiment, seal (1699) is added to back-post (1693), at a proximal end thereof, for additional sealing. Referring to FIGS. 20B.1 to 20B.3, FIG. 20B.1 illustrates heat shrink tubing (1695) prior to heating over the back-post. FIG. 20B.2 illustrates heat shrink tubing (1695) heated onto back-post. FIG. 20B.3 illustrates boot (1696) applied over the heat shrink tubing. Comparing with FIGS. 16B.1-16B.3 and FIGS. 19A and 19B, the positioning of the heat shrink tubing over the back-post, back body or differing back-posts does not depart from the scope of the invention to prevent moisture ingress as depicted in FIG. 18.

Referring to FIG. 21A, is an exploded view of back-post (1693) and rubber washer seal (1699) prior to assembly to connector body (1690). Referring to FIG. 21B, washer seal (1699) is inserted onto back-post (1693). Referring to FIG. 21C, washer and back-post are inserted into a distal opening of connector body (1690), with washer (1699) positioned and compressed within connector body (1690). FIG. 21D is a cross section "A-A", of FIG. 21C, illustrates washer (1699) is compressed by back-post (1693) upon final assembly. Back-post cut-out (1693b) is captured and secured within corresponding protrusion (1690d) located at a distal end inside of connector body (1690).

Figure 22A:
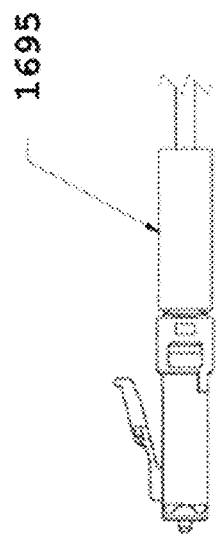
FIG. 22A is a side view of the heat shrink tubing prior to heating and securing over the connector distal end.
Figure 22B:
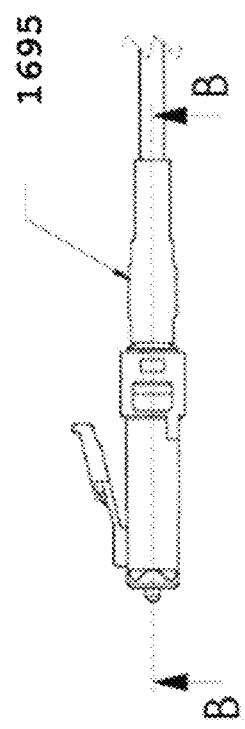
FIG. 22B is a perspective view of the heat shrink tubing shrunk and cut-line "B-B".
Figure 22C:
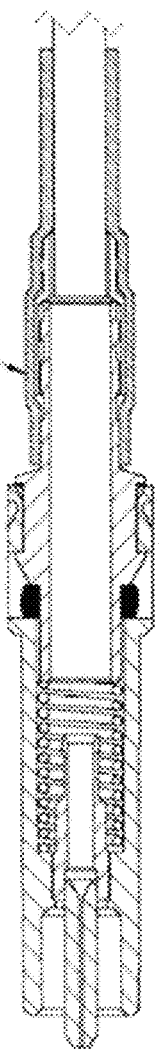
FIG. 22C is a cross section "B-B" of the heat shrink tubing heated and secured over the connector distal end of FIG. 22A, and a back-post secured into a back body compressing the washer.

Referring to FIG. 22A, heat shrink tubing (1695) is positioned over the distal end of the plug frame, and shrunk as shown in FIG. 22C (Section B-B) sealing moisture paths as shown in FIG. 18. Heat shrink tubing is made from an adhesive lined polyolefin jacket. FIG. 22B shows tubing (1695) heated and shrunk over the back body and cabling of the connector assembly. FIG. 22C depicts heat shrink tubing (1695) over back-post (1693).

Figures 23A, 23B, 23C, 23D, 23E:
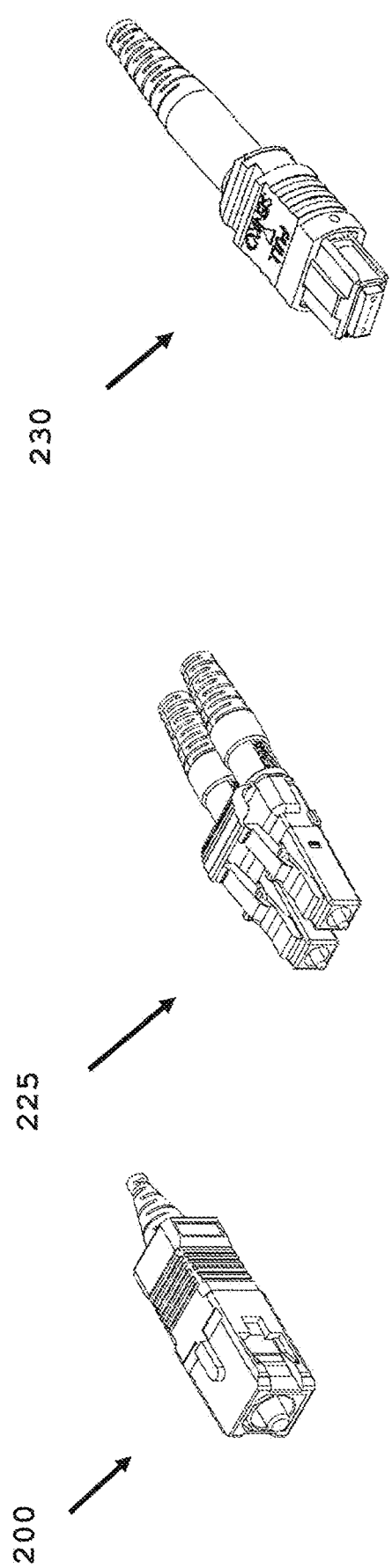
FIG. 23A is a perspective view of a prior art fiber optic connector.
FIG. 23B is a perspective view of a prior art fiber optic connector.
FIG. 23C is a perspective view of a prior art fiber optic connector.
FIG. 23D is a perspective view of a prior art fiber optic connector.
FIG. 23E is a perspective view of a prior art fiber optic connector.

FIGS. 23A-23E depicts standard fiber optic connectors accepted within fiber optic adapter. FIG. 23A depicts a SC connector (200) is accepted by adapter (300) FIG. 23B depicts a duplex LC connector (225) are accepted by adapter (325). FIG. 23C depicts a MPO connector (230) is accepted by adapter (330). FIG. 23D depicts a CS® connector (235) is accepted by adapter (335) with a hook therein, and FIG. 23E depicts a SN® connector (240) is accepted by adapter (340) with a latch therein. CS and SN are trademarks of the current assignee of this patent. The trademark names are for reference only.

Figure 24C:
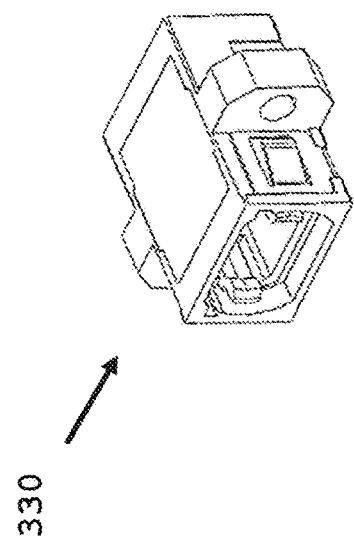
FIG. 24C is a perspective view of prior art fiber optic adapter.
Figure 24B:
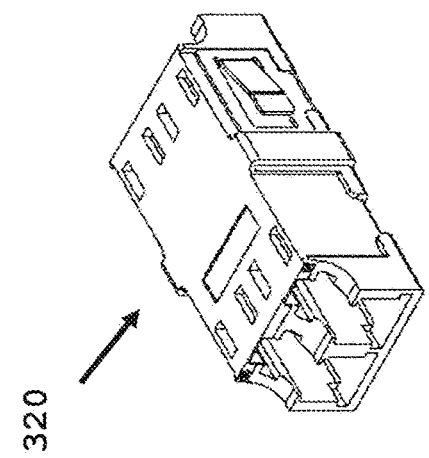
FIG. 24B is a perspective view of prior art fiber optic adapter.
Figure 24E:
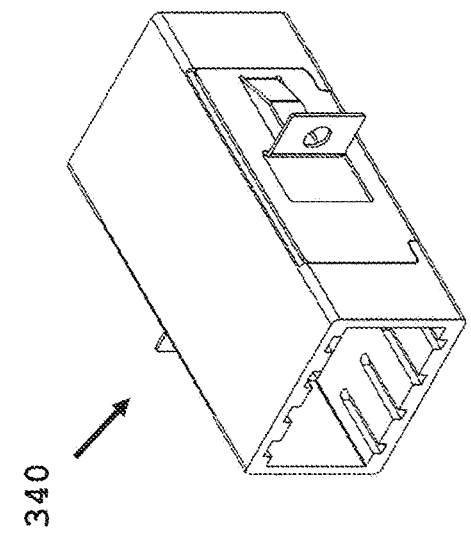
FIG. 24E is a perspective view of prior art fiber optic adapter.
Figure 24A:
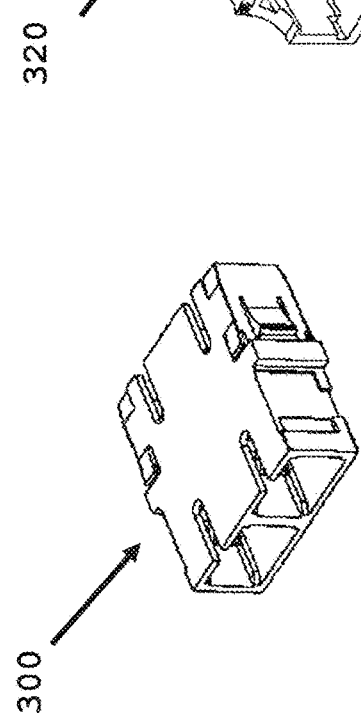
FIG. 24A is a perspective view of prior art fiber optic adapter.
Figure 24D:
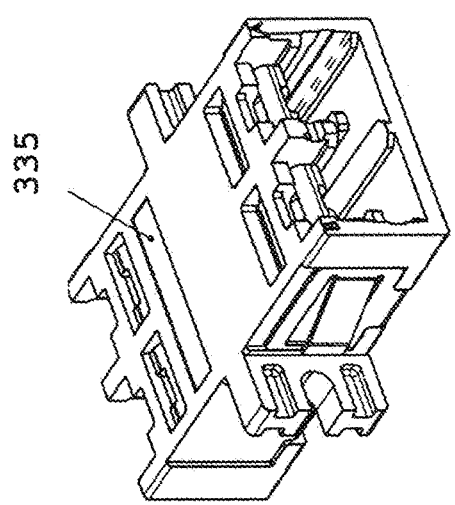
FIG. 24D is a perspective view of prior art fiber optic adapter.

FIGS. 24A-24E depict adapters that can use the present invention of adapter (320) incorporating seal (570). FIG. 24A depicts a SC adapter (300) can accept SC connector (200). FIG. 24B depicts a LC adapter (325) can accept one or more LC connectors (225). FIG. 24C depicts a CS MPO adapter (330) can accept a MPO connector (230). FIG. 24D depicts a CS adapter (335) can accept a CS connector (235). FIG. 24E depicts a SN adapter (340) can accept a SN connector (240).

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

What is claimed is:

1. An optical fiber adapter assembly, comprising:
 a fiber optic connector with a distal end portion and a proximal end portion spaced apart along a connector axis, the proximal end portion comprising an opening at a proximal end;
 an adapter with a sleeve holder configured to receive a sleeve seal, the sleeve holder comprising a wall that extends distally along an axis to a distal end portion of the sleeve holder, the wall having an outer surface and an inner surface extending along the axis, the outer surface comprising a recess spaced apart proximally from the distal end portion of the sleeve holder, the sleeve holder including a proximal-facing shoulder that defines a proximal end of the recess,
 a sleeve seal being received on the sleeve holder such that a portion of the sleeve seal is located in the recess and a distal end portion of the sleeve seal opposes the proximal-facing shoulder; and
 when inserting the fiber optic connector into a receptacle of the adapter, the sleeve seal is partially received within the opening of the fiber optic connector compressed between the fiber optic connector and the adapter thereby forming a barrier against moisture and debris ingress.

2. The fiber optic connector assembly of claim 1, further comprising a heat shrinkable material placed over a distal end portion of the fiber optic connector to further provides provide a barrier against moisture and debris ingress.

3. The optical fiber adapter assembly according to claim 1, wherein the seal is formed from a rubber gasket.

4. The optical fiber adapter assembly according to claim 1, wherein the sleeve holder has a recess about an outer surface of the sleeve holder configured to receive the seal.

5. The optical fiber adapter assembly according to claim 3, wherein the seal is received within the recess and a back portion of the adapter receptacle.

6. The optical fiber adapter assembly according to claim 1, wherein a second seal is positioned between an adapter outer housing and a mounting panel for preventing moisture and debris passing from a first side of the mounting panel to a second side of the mounting panel.

7. The optical fiber adapter assembly according to claim 1, wherein the connector further comprises a back-body and a crimp ring, the back-body and the crimp ring are sealed with a heat shrinkage material to prevent moisture and debris ingress at a distal end of the fiber optic connector.

8. The optical fiber adapter assembly according to claim 6, wherein the connector further comprises a boot, the boot is configured to be secured over heat shrinkage material thereby further sealing the distal end of the fiber optic connector from moisture and debris ingress.

9. The fiber optic adapter assembly according of claim 7, wherein a second portion of heat shrinkable material is positioned over the boot and heat shrinkable material thereby sealing the distal end of the fiber optic connector from moisture and debris ingress.

10. The fiber optic adapter assembly of claim 6, wherein a washer seal is positioned between a back body and a plug frame thereby sealing the distal end of the fiber optic connector from moisture and debris ingress.

11. The fiber optic adapter assembly of claim 9, wherein a third portion of heat shrinkable material is positioned over the back-body and the crimp ring thereby sealing the distal end of the connector from moisture and debris ingress.

12. The fiber optic adapter assembly of claim 1, wherein the fiber optic connector is selected from a group comprising a SC connector, a LC connector, a MPO connector, a CS connector or a SN connector.

13. The fiber optic adapter assembly of claim 1, wherein the adapter is selected from a group comprising a SC adapter, a LC adapter, a MPO adapter, a CS adapter or a SN adapter.

14. The fiber optic adapter assembly of claim 12, wherein openings between the adapter housing and a mounting panel are removed.

15. The fiber optic adapter assembly of claim 12, wherein a distance between pilot holes is about 18 mm or less.

* * * * *